United States Patent
Yamamoto et al.

(10) Patent No.: US 7,337,353 B2
(45) Date of Patent: Feb. 26, 2008

(54) FAULT RECOVERY METHOD IN A SYSTEM HAVING A PLURALITY OF STORAGE SYSTEMS

(75) Inventors: Yasutomo Yamamoto, Sagamihara (JP); Yoshiaki Eguchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 417 days.

(21) Appl. No.: 10/878,440

(22) Filed: Jun. 29, 2004

(65) Prior Publication Data

US 2005/0268147 A1   Dec. 1, 2005

(30) Foreign Application Priority Data

May 12, 2004  (JP) ............................. 2004-142179

(51) Int. Cl.
*G06F 11/00* (2006.01)
(52) U.S. Cl. ............................................ 714/7; 714/47
(58) Field of Classification Search .................. 714/7, 714/47
See application file for complete search history.

(56) References Cited

U.S. PATENT DOCUMENTS

| | | | |
|---|---|---|---|
| 5,680,640 A | | 10/1997 | Ofek et al. |
| 5,727,144 A | * | 3/1998 | Brady et al. ................... 714/6 |
| 6,098,129 A | | 8/2000 | Fukuzawa et al. |
| 6,332,204 B1 | * | 12/2001 | Russell ........................ 714/710 |
| 6,442,711 B1 | * | 8/2002 | Sasamoto et al. ............ 714/38 |
| 6,460,151 B1 | * | 10/2002 | Warwick et al. ............. 714/718 |
| 6,571,354 B1 | | 5/2003 | Parks et al. |
| 6,598,174 B1 | | 7/2003 | Parks et al. |
| 6,880,101 B2 | * | 4/2005 | Golasky et al. ................ 714/4 |
| 6,892,276 B2 | * | 5/2005 | Chatterjee et al. ........... 711/114 |
| 7,103,798 B2 | * | 9/2006 | Morita ............................ 714/6 |
| 7,120,832 B2 | * | 10/2006 | Collins et al. ................ 714/42 |
| 7,133,966 B2 | * | 11/2006 | Sato et al. .................... 711/114 |
| 7,146,522 B1 | * | 12/2006 | Rowe et al. ..................... 714/6 |
| 2002/0066050 A1 | | 5/2002 | Lerman et al. |
| 2004/0260967 A1 | * | 12/2004 | Guha et al. ..................... 714/3 |
| 2005/0114728 A1 | | 5/2005 | Aizawa et al. |
| 2005/0125604 A1 | | 6/2005 | Williams |
| 2005/0193273 A1 | | 9/2005 | Burkey |

FOREIGN PATENT DOCUMENTS

| | | |
|---|---|---|
| JP | 10-508967 | 9/1998 |
| JP | 10-283272 | 10/1998 |

* cited by examiner

*Primary Examiner*—Gabriel Chu
(74) *Attorney, Agent, or Firm*—Mattingly, Stanger, Malur & Brundidge, PC

(57) ABSTRACT

System availability is improved in a second storage system, connected to a first storage system, and having means for virtualizing devices within the first storage system as its own devices. When the virtual storage system or a storage management server detects a fault in the virtual storage system, the management server investigates the range affected by the fault, identifies a device for which measures must be taken, determines a transfer target device which accommodates the performance, reliability, and other attributes of the affected device, and issues a device transfer instruction for the virtual storage system. In the virtual storage system, the data of the device specified by the instruction within the virtual storage system is transferred to a device, specified by the management server, within the system itself, or to a device within another virtual storage system.

17 Claims, 13 Drawing Sheets

FIG.2
(a)
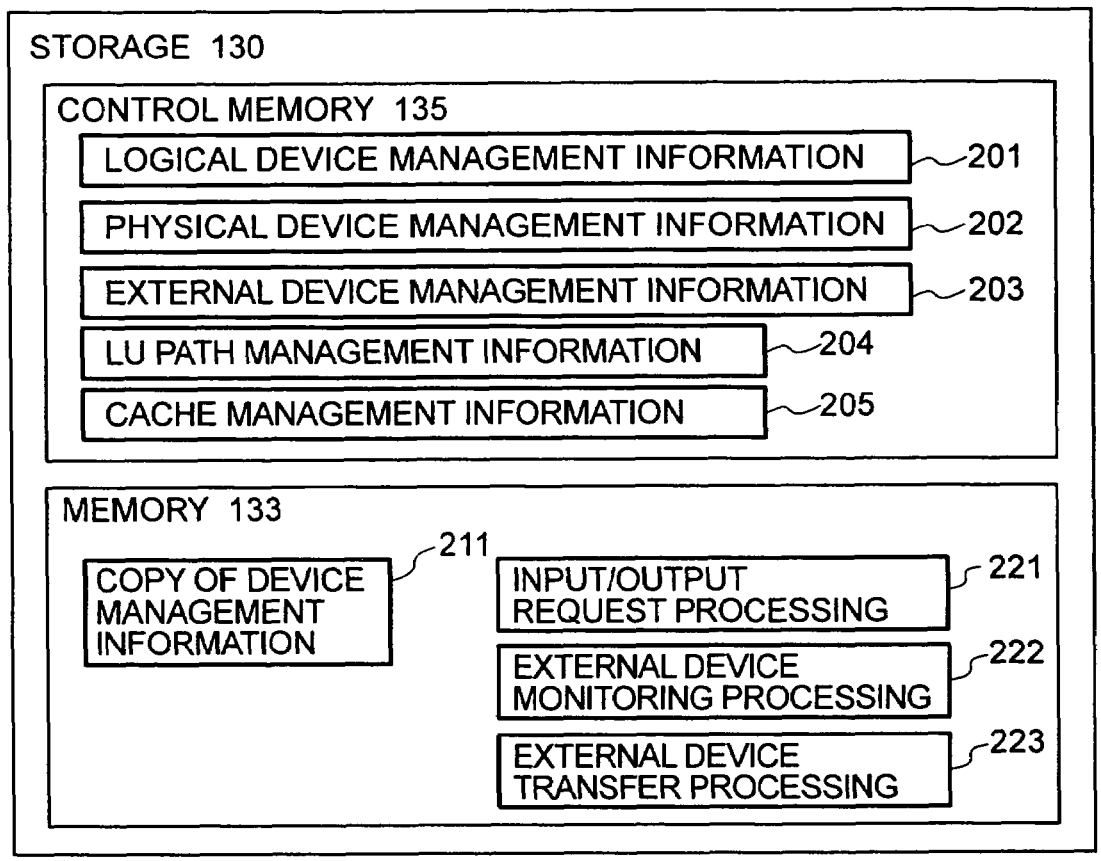
(b)
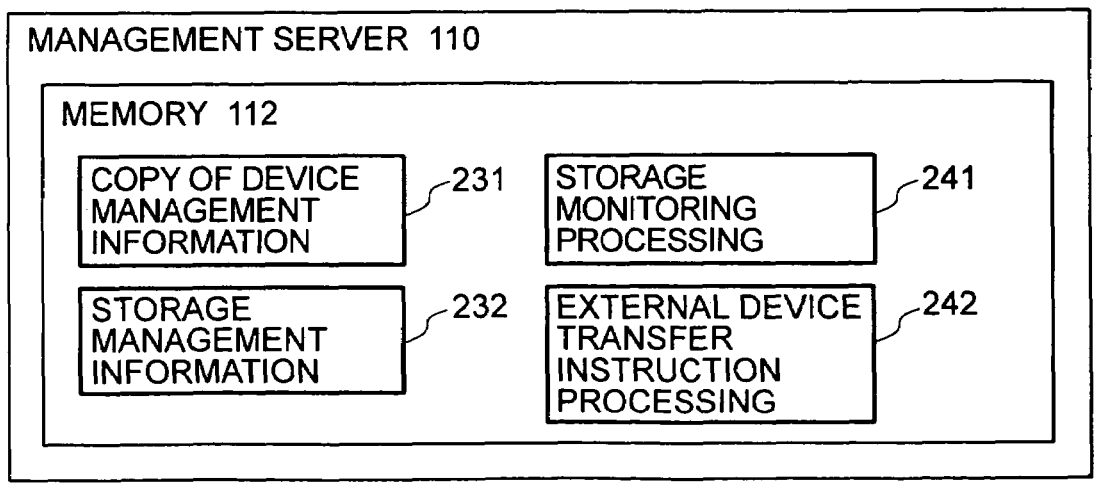

FIG.3

LOGICAL DEVICE MANAGEMENT
INFORMATION 201

CONFIGURATION INFORMATION FOR HIGHER-LEVEL LOGICAL DEVICE #0:

| Field | Ref |
|---|---|
| LOGICAL DEVICE NUMBER | 31 |
| SIZE | 32 |
| ASSOCIATED PHYSICAL/EXTERNAL DEVICE NUMBER | 33 |
| DEVICE STATE | 34 |
| PORT NUMBER / TARGET ID / LUN | 35 |
| CONNECTED HOST NAME | 36 |
| PHYSICAL/EXTERNAL DEVICE NUMBER DURING TRANSFER | 37 |
| DATA TRANSFER PROGRESS POINTER | 38 |
| DATA TRANSFER EXECUTION FLAG | 39 |

FIG.4

LU PATH MANAGEMENT INFORMATION 204

CONFIGURATION INFORMATION FOR PORT #0:

| Field | Ref |
|---|---|
| TARGET ID / LUN | 41 |
| ASSOCIATED LOGICAL DEVICE NUMBER | 42 |
| CONNECTED HOST NAME | 43 |

FIG.5

PHYSICAL DEVICE MANAGEMENT
INFORMATION 202

CONFIGURATION INFORMATION FOR PHYSICAL DEVICE #0

| | |
|---|---|
| PHYSICAL DEVICE NUMBER | ~51 |
| SIZE | ~52 |
| ASSOCIATED LOGICAL DEVICE NUMBER | ~53 |
| DEVICE STATE | ~54 |
| RAID CONFIGURATION (RAID LEVEL, DATA/PARITY [ DISKS]) | ~55 |
| STRIPE SIZE | ~56 |
| DISK NUMBER LIST | ~57 |
| START OFFSET WITHIN DISK | ~58 |
| SIZE WITHIN DISK | ~59 |
| ⋮ | |

FIG.6

EXTERNAL DEVICE MANAGEMENT
INFORMATION 203

CONFIGURATION
INFORMATION
FOR EXTERNAL
DEVICE #0

| | |
|---|---|
| EXTERNAL DEVICE NUMBER | 61 |
| SIZE | 62 |
| ASSOCIATED LOGICAL DEVICE NUMBER | 63 |
| DEVICE STATE | 64 |
| STORAGE IDENTIFICATION INFORMATION | 65 |
| EXTERNAL STORAGE DEVICE NUMBER | 66 |
| INITIATOR PORT NUMBER LIST | 67 |
| TARGET PORT ID / TARGET ID / LUN LIST | 68 |

FIG.7

STORAGE MANAGEMENT INFORMATION 232

MANAGEMENT INFORMATION FOR STORAGE UNIT #0

| STORAGE UNIT NUMBER | 71 |
| --- | --- |
| STORAGE UNIT NAME | 72 |
| PORT NAME LIST | 73 |
| PERFORMANCE/RELIABILITY LEVEL | 74 |
| TOTAL CAPACITY | 75 |
| FREE CAPACITY | 76 |
| ⋮ | |

FIG.14

CONFIGURATION INFORMATION FOR LOGICAL DEVICE #0

| | |
|---|---|
| LOGICAL DEVICE NUMBER | 1401 |
| SIZE | 1402 |
| ASSOCIATED PHYSICAL/EXTERNAL DEVICE NUMBER | 1403 |
| DEVICE STATE | 1404 |
| RAID CONFIGURATION (RAID LEVEL, DATA/PARITY [DISKS]) | 1405 |
| STRIPE SIZE | 1406 |
| PHYSICAL/EXTERNAL DEVICE NUMBER LIST | 1407 |
| TRANSFER/RECOVERY SOURCE PHYSICAL/LOGICAL DEVICE NUMBER  TRANSFER/RECOVERY TARGET PHYSICAL/LOGICAL DEVICE NUMBER | 1408 |
| DATA TRANSFER/ RECOVERY PROGRESS POINTER | 1409 |
| DATA TRANSFER/RECOVERY EXECUTION FLAG | 1410 |
| ⋮ | |

FAULT RECOVERY METHOD IN A SYSTEM HAVING A PLURALITY OF STORAGE SYSTEMS

CROSS-REFERENCES TO RELATED APPLICATIONS

This application relates to and claims priority from Japanese Patent Application No. 2004-142179, filed on May 12, 2004, the entire disclosure of which is incorporated herein by reference.

BACKGROUND

This invention relates to a storage system comprising storage which stores data used by computers in a computer system. In particular, this invention relates to control technology in a storage system comprising storage having means for connecting one or more storage units, and for rendering virtual, as its own device, a device within the connected storage unit.

In recent years there has been explosive growth in the volume of data handled by computers, and as a consequence the capacity of storage unit for storing data is steadily being increased. As a result, storage management costs account for an increasing fraction of system management costs, and the need to lower management costs has become an urgent issue for system operation.

In order to expand storage capacity, new storage may be introduced into an existing computer system comprising a computer (hereafter called a "host") and storage unit. Two such modes of introduction are conceivable, one in which new large-capacity storage unit is introduced to replace older storage unit, and the other in which the new storage unit is used in conjunction with the older storage unit.

In the case of a mode of introduction in which new storage unit replaces old equipment, all the data within the old storage unit must be transferred to the new storage unit. However, ordinarily the data must be transferred while continuing data input from and output to a host.

Technology to transfer the data of old storage unit to new storage unit, while continuing data input/output with a host, has for example been disclosed in JP-A-10-508967.

Here, the data of a first device of the old storage unit is transferred to a second device allocated to the new storage unit, and the access target from the host is changed from the existing first device to the new second device, so that input/output requests issued from the host to the existing first device are accepted by the new storage unit.

Read requests issued during the transfer are handled by reading from the second device for portions transfer of which has been completed, and by reading from the existing first device for portions transfer of which has not been completed. In the case of write requests, duplicate writing to both the first device and the second device is performed.

In a mode of introduction in which old storage unit and new storage unit are used in conjunction, a mode is possible in which both the new and old storage units are connected directly to the host; but control on the host side is complex.

On the other hand, in for example Japanese Patent Laid-open No. 1-283272, a method is disclosed by which a host accesses a disk of a first storage unit through a second storage unit.

A configuration is employed in which the first storage unit is connected to the second storage unit, disk addresses of the second storage unit are allocated to disks of the first storage unit, and the host also accesses the disks of the first storage unit through the disk control device of the second storage unit.

Upon receiving an input/output request from the host, the second storage unit judges whether the disk being accessed is a disk of the first storage unit or is a disk within the second storage unit, and distributes the input/output request to the access target according to the judgment result.

SUMMARY

By applying the technology disclosed in Japanese Patent Laid-open No. 10-283272, that is, technology whereby a storage unit has the host recognize a disk of another storage unit connected to itself as its own disk, a storage system can be constructed in which a plurality of storage units, with different attributes such as performance, reliability and cost, can be integrated.

For example, when new storage unit is installed in a computer system, if the newly installed new-type storage unit, having the functions disclosed in the above-described Japanese Patent Laid-open No. 10-283272, is directly connected to the host in a configuration in which the old-type storage unit already possessed by the user is connected to the new-type storage unit, the user can effectively utilize existing resources, and the cost of installation in the system can be reduced.

When constructing a computer system, if the storage system adopts a configuration in which a plurality of low-cost, low-functionality storage units are connected to high-cost, high-functionality storage unit having functions disclosed in the above-described Japanese Patent Laid-open No. 10-283272, then a hierarchical storage system can be realized in which data is optimally arranged according to the freshness and value of the data. In such a storage system, a large volume of data such as the transaction information and mail logs which occur in the course of daily operations, and which although not accessed frequently must be preserved for long periods of time for monitoring or other purposes, can be stored in the low-cost, low-functionality storage unit, so that storage resources can be utilized effectively.

However, in the above-described storage system, old-type storage unit which is the existing resources of the user coexists with low-cost storage unit the purpose of which is to store large amounts of data at low cost. There is a strong possibility that such storage unit, with comparatively low reliability, may detract from the reliability of the storage system and of the entire computer system.

Further, when a storage system is configured by connecting a plurality of storage units, such connections may be through a network. In this case, network faults may result in blockage of access paths.

As stated above, a storage system comprising second storage unit, having means for connecting first storage unit and for rendering virtual a device within the first storage unit as a device within the second storage unit, is often configured integrating a plurality of storage units with different performance, reliability, cost, and other attributes. Hence due to the existence of comparatively low-reliability storage unit and to the existence of a network connecting storage unit in such a storage system, there is the problem that the availability of the storage system and of a computer system comprising the storage system cannot be improved.

In light of the above, availability can be improved in a computer system having second storage unit which has means for connecting first storage unit, and for rendering virtual a device within the first storage unit as its own internal device.

In order to attain this object, a computer system comprises a management server, which manages both a first storage unit, and also a second storage unit which provides to the host computer as logical devices both a logical device provided by the first storage unit (hereafter called an "external device") and its own physical device. This management server comprises transfer source decision means which, based on information received from the second storage unit prognosticating a fault in the above external device, identifies the range influenced by the fault as the transfer source, and data transfer instruction means which, based on the data capacity of the transfer source and on evaluations of performance and reliability levels established in advance, determines the transfer targets in the storage range of the first storage unit managed by itself and the second storage unit, and issues to the second storage unit an instruction to transfer the data of the above transfer source to the above transfer target.

Availability can be improved in such a computer system comprising a second storage unit having means for connecting a first storage unit and for rendering virtual a device within the first storage unit as its own internal device.

BRIEF DESCRIPTION OF THE DRAWINGS

FIG. 2A shows one example of control information stored in storage control memory and in memory, and a program for storage control processing, in the first aspect;

FIG. 2B shows one example of control information stored in the memory of the management server of the first aspect, and one example of a program for storage control processing;

FIG. 3 shows one example of logical device management information in the first aspect;

FIG. 4 shows one example of LU path management information in the first aspect;

FIG. 5 shows one example of physical device management information in the first aspect;

FIG. 6 shows one example of external device management information in the first aspect;

FIG. 7 shows one example of storage management information in the first aspect;

DESCRIPTION OF THE PREFERRED EMBODIMENTS

Figure 1:
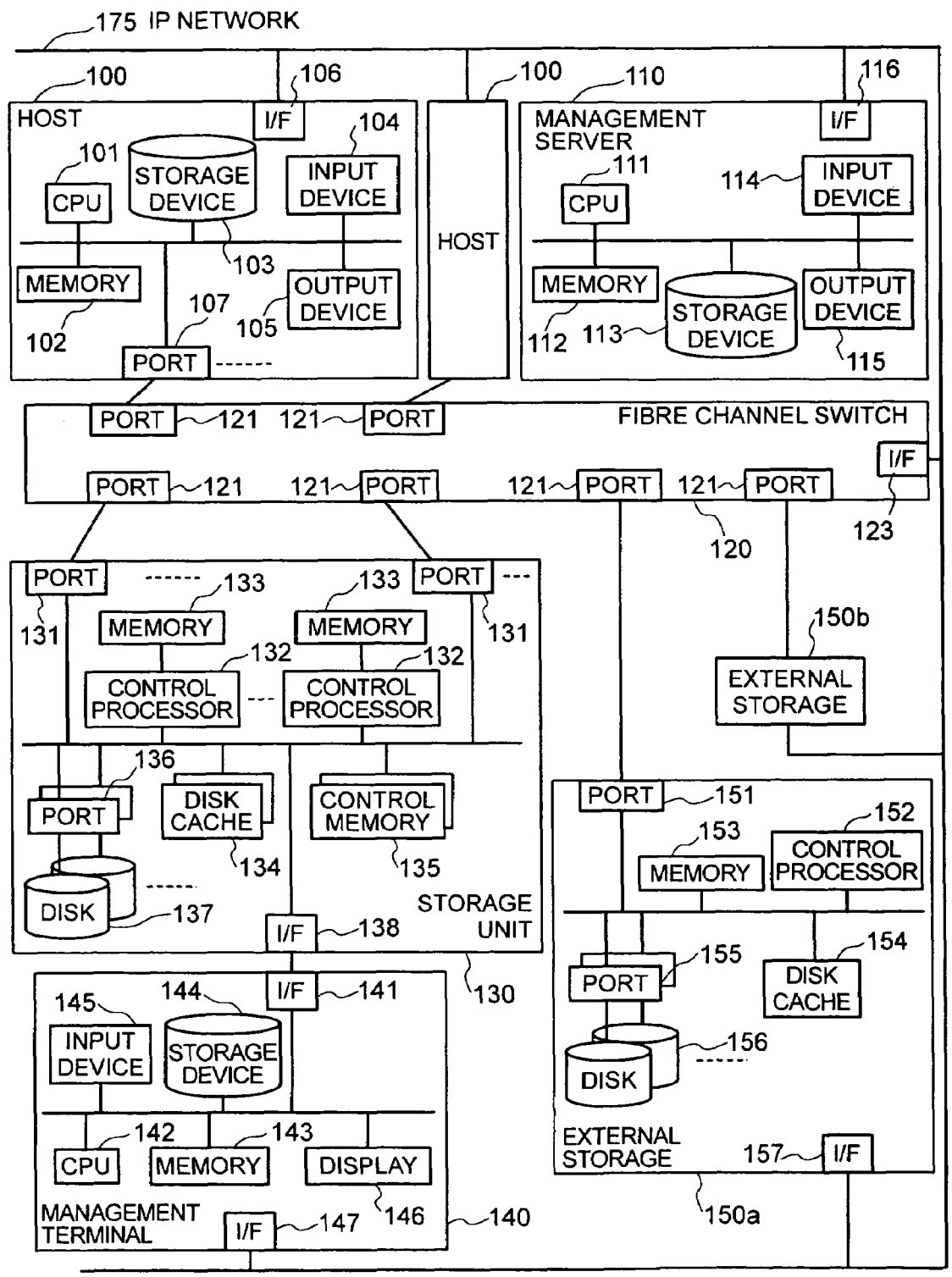
FIG. 1 shows one example of the hardware configuration of a computer system to which a first aspect is applied.

As aspects of the invention, first and second aspects are explained.

The first aspect is summarized below.

The system assumed in the first aspect is a storage system in which one or more first storage units are connected, as external storage, to a second storage unit having external storage connection functions.

Here, the external storage connection functions of the above second storage unit are functions by which, upon receiving an access request from the host, the second storage unit judges whether the device for input/output of the access request is a device existing in a first storage unit or is a device in the second storage unit itself, and if a device in a first storage unit, transmits the access request to the first storage unit, but if a device in itself, accesses the device.

The first aspect endeavors to provide data integrity, at the time that a prognostication of occurrence of a fault in a device within a first storage unit is discovered, by transferring data stored in the device for which the fault prognostication has occurred to another device.

A server provided to manage storage (hereafter called a "management server") detects the occurrence of prognostications of faults in a first storage unit, based on anomaly reports from first storage units, and on warnings from the second storage unit of anomalies in first storage units. Warnings are issued from the second storage unit based on prognostications of faults in first storage units, detected by monitoring responses during accessing of first storage units and similar.

The management server, after detecting a fault prognostication, identifies devices within the first storage unit of the fault prognostication which would be affected were the fault to occur, and decides on the device for data transfer, while also selecting the device to be the transfer target based on the attributes of the device for data transfer. Then the data transfer is instructed to the first storage unit.

The second aspect is summarized below.

Similarly to the first aspect, a storage system of the second aspect is configured with one or more first storage units connected to a second storage unit having external storage connection functions. In the second aspect, a first storage unit uses a plurality of devices in a RAID (Redundant Array of Independent Disks) configuration, which is provided to the host as a disk device of the second storage unit.

In the second aspect, in addition to a function to endeavor to provide data integrity prior to occurrence of a fault similarly to the first aspect, the data stored in a device in which a fault actually occurs is recovered and is transferred to another device.

Similarly to the first aspect, upon receiving a first storage unit anomaly report the management server identifies the range affected by the anomaly, decides on the transfer source and transfer target, and issues a data transfer instruction to the second storage unit. Further, upon receiving a report of the actual occurrence of a fault, the management server utilizes RAID properties to recover the data stored on the device in which the fault occurred, and issues an instruction to the second storage unit to store the recovered data on a device selected as the transfer target.

First Aspect

The first aspect is explained referring to FIG. 1 through FIG. 12.

FIG. 1 shows one example of the hardware configuration of a computer system to which the first aspect of this invention is applied.

The computer system comprises one or more host computers (hereafter called "hosts") 100; a management server 110; a fibre channel switch 120; storage unit 130; a management terminal 140; and external storage unit 150a and 150b (collectively called "external storage 150").

The hosts 100, storage unit 130 and external storage unit 150 are connected to ports 121 of the fibre channel switch 120 via the ports 107, 131, 151 respectively. The host 100, storage unit 130, external storage unit 150, and fibre channel switch 120 are connected to the management server 110 via the interface control portions (I/F) 106, 138, 157, 123 respectively through the IP network 175, and are integrated and managed by storage management software, not shown, which runs on the management server 110.

In this aspect, the storage unit 130 is connected to the management server 110 via the management terminal 140; however, a configuration may be employed in which the storage unit 130 is connected directly to the IP network 175.

The hosts 100 are computers which execute applications and access the storage unit 130, and each comprise a CPU 101, memory 102, storage device 103, input device 104, output device 105, interface control portion 106, and port 107.

The CPU 101 reads the operating system, application programs, and other software stored on a hard disk, magneto-optical disk or other storage device 103 to memory 102, and by executing the software performs prescribed functions.

The input/output device 104 is a keyboard, mouse or similar, which receives input from the host manager. The output device 105 is a display or similar, which outputs information as instructed by the CPU 101. The interface control portion 106 is provided for connection to the IP network 175, and the port 107 is provided for connection to the fibre channel switch 120.

The management server 110 is a computer which manages operation and maintenance of the entire computer system of this aspect, and is a computer comprising a CPU 111, memory 112, storage device 113, input device 114, and output device 115.

The input/output device 114 is a keyboard, mouse or similar, which receives input from the storage manager. The output device 115 is a display or similar, which outputs information as instructed by the CPU 111. The interface control portion 116 is provided for connection to the IP network 175.

The CPU 111 reads storage management software and similar, stored on a hard disk, magneto-optical disk or other storage *device 113, into memory 112, and by executing the software performs prescribed functions.

The management server 110 collects configuration information, resource usage rates, performance monitoring information, fault logs and similar from various equipment within the computer system via the interface control portion 116 and IP network 175, according to the storage management software, and outputs the collected information to the output device 115, to present the information to the storage manager.

The management server 110 transmits operation and maintenance instructions, received from the storage manager via the input device 114, to various equipment via the interface control portion 116.

The storage unit 130 is storage unit comprising external storage connection functions, and further comprises one or more ports 131; one or more control processors 132; one or more memory units 133 connected to the control processors 132; one or more disk caches 134; one or more control memory units 135; one or more ports 136; one or more disk devices 137 connected to the ports 136; and an interface control portion 138.

The control processor 132 identifies the device to be accessed for an input/output request received from a host 131, and processes the input/output request for a device within a disk device 137 or external storage unit 150 corresponding to the identified device.

The device to be accessed is identified by a port ID and LUN (Logical Unit Number), contained within the input/output request received by a control processor 132.

In this aspect, the ports 131 are assumed to be ports to the fibre channel interface which use SCSI (Small Computer System Interface) as the higher-level protocol. However, the ports may also be ports to IP network interfaces using SCSI as the higher-level protocol, or ports to other network interfaces for connection to storage unit.

The device to be accessed is identified from the port ID and LUN contained in the input/output request as follows.

The storage unit 130 of this aspect has the following device hierarchy.

A disk array is configured from a plurality of disk devices 137. The control processors 132 manage the disk array as a physical device. The control processors 132 also allocate logical devices to the physical devices within the storage unit 130 (that is, the control processors 132 associate physical devices with logical devices).

Here, logical devices are associated with LUNs allocated to each of the ports 131, and are provided to hosts 100 as devices of the storage unit 130. A logical device is managed within the storage unit 130, and its number is managed independently for each storage unit. A host 100 recognizes only logical devices of the storage unit 130. A host 100 uses the LUN of a port 131 associated with a logical device to access data stored in the storage unit 130.

The storage unit 130 of this aspect also has functions to render virtual the devices in external storage unit 150 as its own devices. A logical device provided by external storage unit 150 (hereafter called an "external device") to storage unit 130 is rendered virtual as a device of the storage unit 130 and provided to the host 100. Within the storage unit 130, an external device is, like a physical device within the storage unit 130, associated with and managed as one or more logical devices of the storage unit 130.

In order to realize the above device hierarchy, a control processor 132 manages the associative relations between logical devices, physical devices, disk devices 137, external devices, and the physical devices of external storage unit 150. In this aspect, these associative relations are retained in control memory 135.

A control processor 132 converts access requests for a logical device into access requests for devices within a disk device 137 or for logical devices of external storage unit, based on the associative relations managed by the control processor 132.

The storage unit 130 of this aspect combines a plurality of disk devices 137 to define one or a plurality of physical devices (that is, a plurality of disk devices 137 are combined and associated as one or a plurality of physical devices), allocates one logical device to one physical device, and provides this to a host 100. However, each disk device 137 may instead be provided to a host 100 as one physical device and as one logical device.

In addition to input/output processing for devices, a control processor 132 also executes various processing to realize data links between devices, such as data copying and data redistribution.

Further, a control processor 132 transmits configuration information for presentation to the storage manager to a management terminal 140, connected via the interface control portion 138; receives maintenance and operation instructions, input by the manager to the management terminal 140, from the management terminal 140; and alters the configuration of the storage unit 130 and similar according to the received instructions.

The above-described functions of control processors 132 are realized through execution of a program stored in memory 133.

In order to improve the speed of processing of access requests from a host 100, the disk cache 134 stores data which is frequently read from the disk devices 137, and also temporarily stores write data received from a host 100.

When performing write-after using the disk cache 134, in order to prevent loss of the write data stored in the disk cache 134 before writing to the disk device 137, it is desirable that the disk cache 134 be made nonvolatile memory through battery backup or other means, or that a duplicate configuration be employed to improve tolerance with respect to media faults, or that other means be used to improve the availability of the disk cache 134.

"Write-after" is processing in which, after write data received from a host 100 is stored in the disk cache 134, and before actually writing the data to the disk device 137, a response to the write request is returned to the host 100.

The control memory 135 stores associative relations between devices realized in the above-described device hierarchy and attributes of each device, as well as control information to manage these devices, and control information in the disk cache 134 to manage data which either does or does not reflect disk data. If control information stored in the control memory 135 disappears, data stored in a disk device 137 cannot be accessed by a host 100, and so it is desirable that the control memory 135 be made nonvolatile memory through battery backup or other means, or that a duplicate configuration be employed to improve tolerance with respect to media faults, or that a configuration be used to improve availability.

Each of the components in the storage unit 130 is connected by internal connections as shown in FIG. 1. Through these internal connections, data, control information, and configuration information are transmitted and received between these components, and the control processors 132 can share and manage configuration information for the storage unit 130. From the standpoint of improved availability, it is desirable that the internal connections be made multiply redundant.

The management terminal 140 comprises a CPU 142; memory 143; storage device 144; interface control portion 141 connected to storage unit 130; interface control portion 147 connected to the IP network 175; input device 145 which receives input from the storage manager; and output device 146, such as a display or similar, which outputs to the storage manager configuration information for storage unit 130 and management information.

The CPU 142, by reading a storage management program stored in the storage device 144 to memory 143 and executing the program, references configuration information, issues instructions to alter configurations, and issues instructions to execute specific functions.

The management terminal 140 serves as an interface, relating to maintenance and operation of the storage unit 130, between the storage manager or management server 110 and storage unit 130. The management terminal 140 may be omitted, the storage unit 130 connected directly to the management server 110, and the storage unit 130 managed using management software which runs on the management server 110.

Next, the software configuration of the storage unit 130 and management server 110 of this aspect is explained.

FIG. 2A is a software configuration diagram showing one example of control information stored in the control memory 135 and memory 133 of the storage unit 130, and of a program for storage control processing.

The control memory 135 stores logical device management information 201, physical device management information 202, external device management information 203, LU path management information 204, and cache management information 205. In this aspect, this control information is stored in control memory 135 in order to prevent information loss.

The control information stored in control memory 135 can be referenced and altered by a control processor 132. However, a control processor 132 accesses control memory 135 via internal connections. In this aspect, in order to improve processing performance, a copy of the control information necessary for processing executed by each control processor 132 is retained in memory 133 as a copy 211 of device management information. The information retained as the copy 211 of device management information is the logical device management information 201, physical device management information 202, external device management information 203, and LU path management information 204.

In addition to the copy 211 of device management information, the memory 133 also stores an input/output request processing program 221, an external device monitoring processing program 222, and an external device transfer processing program 223.

Device management information for the storage unit 130 is also transmitted to the control terminal 140 and management server 110, where it is stored.

When the configuration of the storage unit 130 is altered by the management server 110 or management terminal 140 in conformance with storage management software, or upon receiving an instruction from the storage manager, or when the configuration of the storage unit 130 changes due to a fault, automatic substitution or similar, one of the control processors 132 updates the relevant device management information in the control memory 135.

And, the control processor 132 which has updated the device management information then notifies the other control processor 132, the management terminal 140, and the management server 110 of the fact that the relevant device management information has been updated.

FIG. 2B is a software configuration diagram showing one example of control information stored in the memory 112 of the management server 110, as well as a program for storage control processing.

The memory 112 stores a copy 231 of device management information collected from the storage unit 130 and external storage unit 150, as well as storage management information. 232 indicating the attributes of the storage unit 130 and external storage unit 150. In order to avoid data loss, this information may also be retained in the storage device 113 installed in the management server 110.

In addition, the memory 112 also stores a storage monitoring processing program 241 and an external device transfer instruction processing program 242.

Below, this control information is explained.

FIG. 3 shows one example of logical device management information 201.

Configuration information for each of the logical devices is stored in the logical device management information 201. In this aspect, an information set comprising the logical device number 31, size 32, associated physical/external device number 33, device state 34, port number/target ID/LUN 35, connected host name 36, physical/external device number during transfer 37, data transfer progress pointer 38, and data transfer execution flag 39, is stored for each logical device in the logical device management information 201.

A number uniquely allocated to each logical device by a control processor 132 to identify the logical device is stored as the logical device number 31.

The capacity of the logical device specified by the logical device number 31 is stored as the size 32.

The number of the physical device or external device associated with the logical device is stored as the associated physical/external device number 33. In this aspect, the physical device number 51 or external device number 61, which is stored in the physical device management information 202 or external device management information 203 which are management information for the device, is stored as the associated physical/external device number 33. Details of this are explained below.

In this aspect, logical devices and physical/external devices are associated in a one-to-one correspondence. Consequently only one number of an associated physical device or external device is stored as the associated physical/external device number 33. When a plurality of physical/external logical devices are combined to form a single logical device, an area becomes necessary in the logical device management information 201 for storing a list of numbers of physical/external devices associated with each logical device, and the number of such numbers. Also, when a logical device is undefined, an invalid value is set as the associated physical/external device number 33.

Information indicating the state of the logical device is set in the device state 34. States which may be set include "online", "offline", "uninstalled", and "fault-offline". "Online" indicates that the logical device is operating normally and is in a state enabling access by a host 100. "Offline" indicates that the logical device is defined and is operating normally, but because the LU path is undefined or for some other reason, is not in a state enabling access by a host 100. "Uninstalled" indicates that the logical device is not defined, and so is not in a state enabling access by a host 100. "Fault-offline" indicates that a fault has occurred in the logical device, and that access by a host 100 is not possible.

The initial value of the device state 34 is "uninstalled"; when the logical device is defined, this is changed to "offline", and when the LU path is defined, this is again changed to "online".

The port number, target ID, and LUN are stored in the port number/target ID/LUN 35.

A port number stored in the entry 35 is information to identify a port 131 of a logical device for which a LUN is defined. The port identification information is a number, assigned to each port 131, which is determined uniquely within the storage unit 130. Information indicating to which port among the plurality of ports 131 the logical device is connected, that is, the number of the port 131 used to access the logical device, is set in the entry 35.

The target ID and LUN stored in the entry 35 are identifiers used to identify the logical device. In this aspect, as identifiers used to identify a logical device, a SCSI-ID used for accessing by a host 100 via SCSI, and the LUN, are stored.

The above-described values are set in the entry 35 when a LU path definition is executed for a logical device.

The connection host name 36 is a host name which identifies the host 100 which is permitted to access the logical device. As the host name, a WWN (World Wide Name) assigned to the port 107 of the host 100, or any other value capable of uniquely identifying the host 100 or the port 107, may be used. The entry 36 is set by the storage manager at the time the logical device is defined.

As the physical/external device number during transfer 37, the physical/external device number of the transfer target of the physical/external device to which the logical device is allocated during data transfer (when the data transfer execution flag 39, described below, is "on"), is stored.

The data transfer progress pointer 38 is information indicating the leading address of the area for which data transfer processing has not been completed, and is updated as the data transfer progresses.

The initial value of the data transfer execution flag 39 is "off", and when set to "on" indicates that data transfer is in progress, from the physical/external device to which the logical device is allocated to another physical/external device. The physical/external device number during transfer 37 and data transfer progress pointer 38 are valid only when the data transfer execution flag 39 is set to "on".

FIG. 4 shows an example of LU path management information 204. For each of the ports 131 in the storage unit 130, the LU path management information 204 stores information for a valid LUN defined for each port.

A LUN defined for (allocated to) a port 131 is stored in the target ID/LUN 41. The number of the logical device to which the LUN is allocated is stored as the associated logical device number 42. Information indicating the host 100 allowed access to the LUN defined for the port 131 is stored as the connected host name 43. The WWN assigned to the port 107 of the host 100 is for example used as the information indicating the host 100.

In some cases the LUNs of a plurality of ports 131 are defined for (allocated to) a single logical device, so that the logical device can be accessed from a plurality of ports 131. In such cases, the union of the connected host names 43 of LU path management information 204 for all of the LUNs of the plurality of ports 131 is stored as the connected host name 36 of the logical device management information 201 for the logical device.

FIG. 5 shows one example of physical device management information 202 used for management of physical devices comprised by disk devices 137.

Each storage unit 130 retains for each physical device existing within its equipment, as the physical device management information 202, an information set comprising the physical device number 51, size 52, associated logical device number 53, device state 54, RAID configuration (RAID level, data/parity disks) 55, stripe size 56, disk number list 57, start offset within disk 58, and size within disk 59.

An identification number to identify the physical device is registered as the physical device number 51. The capacity of the physical device specified by the physical device number 51 is stored as the size 52. The logical device number associated with the physical device is stored as the associated logical device number 53. The associated logical device number 53 is stored at the time the logical device is defined. When the physical device is not allocated to a logical device, an invalid value is set as the associated logical device number 53.

Information indicating the state of the physical device is set in the device state 54. States which may be set include "online", "offline", "uninstalled", and "fault-offline". "Online" indicates that the physical device is operating normally and is in a state of allocation to a logical device. "Offline" indicates that the physical device is defined and is operating normally, but is in a state of not being allocated to a logical device. "Uninstalled" indicates that the physical device is not defined for the disk device 137. "Fault-offline" indicates that a fault has occurred in the physical device, and that the physical device is not allocated to a logical device.

In this aspect, for simplicity it is assumed that physical devices are already created in disk devices 137 at the time of factory shipment. Hence the initial value of device states 53 for physical devices which can be used is "offline", and for other devices is "uninstalled". At the time that a logical device is defined for a physical device, the state is changed to "online".

Information relating to the RAID level, the number of data disks and parity disks, and other RAID configuration information for the disk device 137 to which a physical disk is allocated is stored in the RAID configuration 55. The data division unit (stripe) length in the RAID system is stored as the stripe size 56. Identification numbers for each of the plurality of disk devices 137 comprised by the RAID system to which the physical device is allocated are stored as the disk number list 57. The identification numbers for disk devices 137 are assigned values which are used to uniquely identify each disk device 137 in the storage unit 130.

The start offset within disk 58 and size within disk 59 store information indicating to which areas within the disk devices 137 a physical device is allocated. In this aspect, for simplicity, it is assumed that, for all physical devices, the offset and size are unified within each disk device 137 comprised by the RAID system.

FIG. 6 shows one example of external device management information 203 used to manage external devices provided to the storage unit 130 by external storage unit 150 connected to the storage unit 130.

For each external device, the storage unit 130 stores, as external device management information 203, an external device number 61, size 62, associated logical device number 63, device state 64, storage identification information 65, external storage device number 66, initiator port number list 67, and target port ID/target ID/LUN list 68.

A value allocated uniquely within the storage unit 130 to the external device by a control processor 132 is stored as the external device number 61. The capacity of the external device specified by the external device number 61 is stored as the size 62. The number of the logical device within the storage unit 130 with which the external device is associated is registered as the associated logical device number 63.

Information indicating the state of the external device is set as the device state 64. The states which can be set and their meanings are the same as the device states 54 of the physical device management information 202. Because the storage unit 130 is not connected to the external storage unit 150 in the initial state, the initial value of the device state 64 is "uninstalled".

Information to identify the external storage unit 150 in which the external device is installed is saved as the storage identification information 65. As identification information, a value may be used which uniquely identifies the external storage unit 150. For example, a combination of vendor identification information and of a serial number assigned uniquely by each vendor to the storage unit 150 may be used.

An identification number assigned to the external device by the external storage unit 150 in which the external device is installed is stored as the external storage device number 66. In this aspect, an external device is a logical device of external storage unit 150, and so the logical device number assigned for use in identifying the logical device which the external storage unit 150 itself has defined is stored as the external storage device number 66.

The identification number for a port 131 of storage unit 130 capable of accessing the external device is registered as the initiator port number list 67. When the external device can be accessed from a plurality of ports 131, all the identification numbers of ports capable of access are registered.

When the external device defines LUNs for one or more ports of the external storage unit 150, one or a plurality of port IDs for these ports 151, and the target IDs/LUNs allocated to the external device, are stored as the target port ID/target ID/LUN list 68. When a control processor 132 of the storage unit 130 accesses an external device (when an input/output request is transmitted by the control processor from a port 131 to an external device), the target ID and LUN allocated to the external device by the external storage unit 150 to which the external device belongs are used as information to identify the external device.

In this aspect, the storage unit 130 uses the above-described four items of device management information (logical device management information 201, physical device management information 202, external device management information 203, and LU path management information 204) to manage the device.

It is assumed that at the time of factory shipment of the storage unit 130, physical devices are defined for each of the disk devices 137. Further, at the time of introduction of the storage unit 130 a user or storage manager defines logical devices of external storage unit 150 connected to the storage unit 130 as external devices, defines logical devices for the physical devices and external devices, and defines LUNs for each port 131 for the defined logical devices.

FIG. 7 shows an example of storage management information 232 in the management server 110.

Information used to manage the storage unit 130 and external storage unit 150 managed by the management server 110 is stored in the storage management information 232. In the following explanation of the storage management information 232, when there is no need in particular to distinguish the storage unit 130 and external storage unit 150, both are represented as "storage unit". Similarly, disk devices 137, 156 and control processors 132, 152 which are components of storage unit are represented as "disk devices" and "control processors".

An information set comprising, for each storage unit, a storage number 71, storage name 72, port name list 73, performance/reliability level 74, total capacity 75, and free capacity 76, is stored as the storage management information 232.

A number determined uniquely within the system and allocated to each storage unit by the management server 110 is stored as the storage number 71.

Information indicating an identifier used to specify the storage unit is registered as the storage name 72. As the identifier, the platform WWN of the fibre channel, or a combination of the vendor identifier and product number for the storage unit, may be used.

WWNs assigned to ports of the storage unit are stored in the port name list 73. A host 100 uses the port WWNs of the storage unit 130 stored in the port name list 73 to specify a port to be used when accessing a device in the storage unit 130.

Values representing evaluations, based on unified standards for computer systems, of the performance and reliability of the storage unit, are stored in the performance/reliability level 74.

Indexes used to evaluate performance may include such performance values as the seek time and disk rotation speed of the disk devices installed in the storage unit, the storage capacities of disk devices, the RAID level configuration in the storage unit, the communication bandwidth of connections between control processors and disk devices, port communication bandwidths, the number of communication lines, the storage capacity of the disk cache, and nominal performance values for the storage unit overall.

Depending on the storage unit, there are cases in which disk devices with different attributes and RAID configurations with different attributes coexist within the equipment, so that there are a plurality of performance levels within a single storage unit. But in this aspect, for simplicity, it is assumed that the performance level is set for each storage unit, and can be managed for each storage unit.

Indexes used to evaluate reliability may include the redundancy of the disk devices, control processors, or other components of the storage unit, the RAID level used by the storage unit, the number of substitution paths which can be used, and various other conditions related to product specifications. The various functions of the storage unit, such as for example functions provided by the storage unit for copying or saving logical devices, can also be used as indexes in evaluating reliability.

With respect to the reliability level also, depending on the storage unit it is possible for storage areas with different reliability levels to coexist internally; but to simplify the explanation, in this aspect it is assumed that each storage unit has a single reliability level, and that each storage unit can be managed individually.

In this aspect, performance and reliability levels are managed using five stages of values, from a maximum of "5" to a minimum of "1". The value of the level for each storage unit is determined and set by the storage manager based on catalog values for the storage unit and on the results of tests at the time of equipment introduction.

Information indicating the total capacity of storage areas which can be used in the storage unit is registered as the total capacity 75. The total capacity of storage area which can be used is determined by the storage capacities of disk devices in the storage unit, and by the RAID level configuration in the storage unit. In this aspect, it is assumed that physical devices which can be used are set in advance, and that the total capacity of physical devices which can be used is registered as the total capacity 75.

Information indicating the total capacity of physical devices for which a logical device is not yet defined, among all the physical devices in the storage unit, is registered as the free capacity 76. In this aspect, information indicating the total storage capacity of physical devices in the "offline" state is registered as the free capacity 76. Because physical devices in the "uninstalled" state cannot be used by a host 100, the capacity of such devices is not included.

In the case of an aspect in which a physical device required by the management server 110 is defined according to instructions from a user or storage manager, information indicating the total capacity of unused areas in disk devices installed in the storage unit is registered as the free capacity 76.

Next, returning to FIG. 2, programs stored in the memory 133 and 112 of the storage unit 130 and management server 110 are explained. These programs are executed by each of the control processors and CPUs.

The input/output request processing program 221, external device monitoring processing program 222, and external device transfer processing program 223, which are stored in memory 133 of the storage unit 130, as well as the storage monitoring processing program 241 and external device transfer instruction processing program 242, which are stored in memory 112 of the management server 110, are explained.

The input/output request processing program 221 realizes input/output processing for a logical device. Upon detecting an external device anomaly (a phenomenon which is a prognostication of the occurrence of a fault in an external device) during input/output processing, the input/output request processing program 221 notifies the management server 110.

The external device monitoring processing program 222 periodically monitors external devices, and upon detecting an anomaly in an external device, notifies the management server 110.

The external device transfer processing program 223 performs processing to transfer the data of a specified external device to another device, according to an instruction from the management server 110.

The storage monitoring processing program 241 receives warnings of anomalies in external devices and fault reports from the storage unit 130 and external storage unit 150, creates transfer plans for external devices according to received reports and similar, and issues instructions for transfer of external device data to the storage unit 130.

The external device transfer instruction processing program 242 determines the transfer target when an external device for transfer is specified by the storage monitoring processing program 241.

These programs are used in storage control processing within the various components as explained below.

Data transfer instructions issued when an external device anomaly is detected are executed in concert by the input/output request processing program 221 and/or external device monitoring processing program 222 of the storage unit 130, and by the storage monitoring processing program 241 of the management server 110.

Processing to detect anomalies in external devices during input/output request processing, which is performed by the input/output request processing program 221, is explained below.

Figure 8:
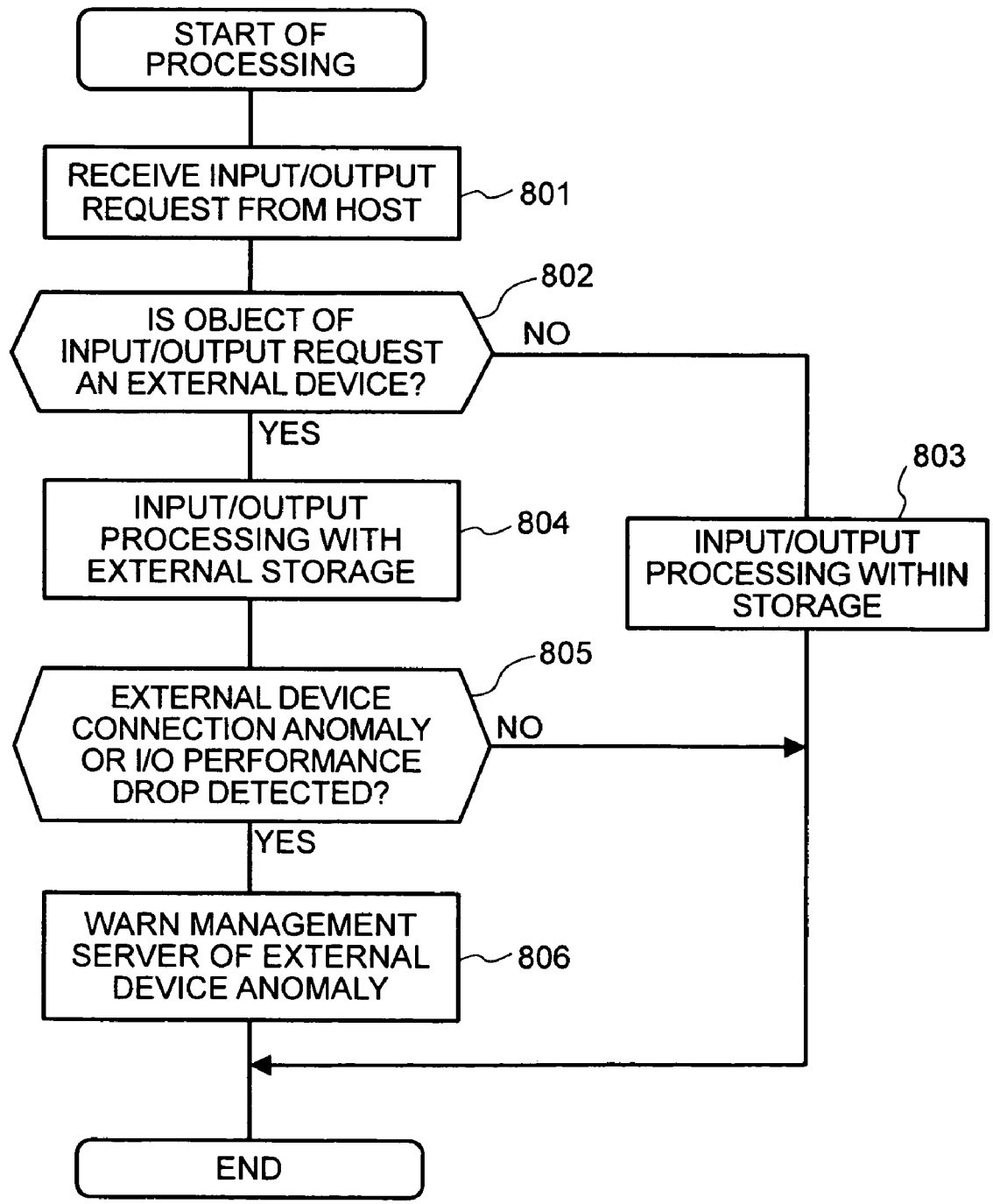
FIG. 8 shows the flow of processing by an input/output request processing program in the first aspect.

FIG. 8 shows an example of the flow of processing to detect anomalies in external devices during input/output request processing, performed by the input/output request processing program 221.

A control processor 132 identifies the physical device or external device associated with the logical device of an input/output request received, from a host 100 at each port 131, for a logical device of the storage unit 130, and performs input/output processing for the physical device, or transmits an input/output request to the external storage unit 150 of the external device, according to the input/output request processing program 221.

In this aspect, upon receiving a fibre channel command frame (step 801), the control processor 132 references the LU path management information 204 and logical device management information 201, and acquires the logical device number which the frame is to access from the LUN contained in the received frame, as well as the physical device number or external device number associated with the logical device (step 802).

When the acquired logical device is associated with a physical device in the storage unit 130, the control processor 132 performs data input/output processing for the disk device 137 housing the physical device, using the disk cache 134, to complete the input/output request processing (step 803).

When on the other hand the logical device is an external device, the control processor 132 performs input/output processing for the external device via a port 131 (step 804). An input/output request for an external device entails essentially the same processing as an input/output request issued by a host 100 for a logical device presented by the storage unit 130.

If, during input/output processing for an external device, an access fault, decline in performance, or other external device anomaly is detected (step 805), the control processor 132 warns the management server 110 of the detection of an external device anomaly (step 806). The warning should include information enabling identification of the fact that an access fault or performance fault has occurred. A warning may also include information to identify the external device for input/output processing, information indicating the grounds for judging an anomaly to have occurred, and similar.

If an external device anomaly is not detected, normal input/output processing is performed.

Detection of access faults or performance decreases in this aspect is performed as follows.

Access faults are judged and detected through responses to input/output requests which have been sent.

External device access faults occur when, for example, a fault (due to cutting or removal of a cable, a switch fault, or similar) occurs in the network leading from ports 131 of the storage unit 130 to ports 151 of the external storage unit 150, or when a fault occurs in a port 151 of the external storage unit 150, in a control processor 152, or similar.

Such access faults are detected through time-outs, as seen by the control processor 132, of input/output requests transmitted to an external device, because access through the specified port 151 is not possible. Having detected the time-out of an input/output request, a control processor 132 executes substitution path processing, similarly to normal cases for disk devices within the storage unit.

First, when an input/output request using a specified port 151 times out, the control processor 132 confirms the state of the path to the external storage unit 150 using the port in question 151.

If the path state is normal, a specified number of input/output requests are again sent over the same path, and if not all of these are successful, the port is switched to a substitute port, and input/output requests are sent once again. If the path state is not normal, repeated trials of the path are skipped, and switching to a substitute port is performed first before resending input/output requests.

If input/output requests from the substitute port are processed without incident, the control processor 132 transmits to the management server 110 a warning message indicating the fact of occurrence of an access fault in the external device.

When, as a result of the above processing, notification of a change in the network state is received, if as a result of checks of the links for all ports 151 of external storage unit 150 for which links have been established (in a fibre channel, node port login) it is found that a link is broken, or when in input/output processing for an external device time-outs have occurred more than a specified number of times for a path using a specified port 151, then the path state is changed to a "blocked" state.

In this aspect, when input/output requests fail for all substitute ports, input to and output from the relevant external device is not possible, and data is lost.

Performance decreases are detected through decreases in responsiveness and throughput of input/output requests for an external device. Each time an input/output request is sent, the control processor 132 acquires the response time and throughput information for the request. The average response times and throughput values acquired in advance are compared for each external storage unit 150, and when the divergence between values is large, an anomaly is judged to have occurred. The divergence threshold value for judgment of occurrence of an anomaly is stored in for example the memory 133 of the storage unit 130, together with information on average response times and throughput.

When, because there is divergence in responsiveness and throughput, it is judged that an anomaly has occurred, information indicating the grounds for this judgment (the responsiveness or throughput) is included in the warning.

Degradation of responsiveness or throughput may occur, for example, as a result of such anomalies as single-sided blockage of the disk cache 154. In normal write processing, a completion response is sent when duplicate writing to the disk cache 154 of the external storage unit 150 is completed. But when there is blockage of one of the disk caches 1.54 to which duplicate writing of data is performed, write-through occurs in which the completion response is sent only when direct writing to the disk device 156 is completed. In write-through mode, the write performance drops dramatically, and problems such as degradation of responsiveness and throughput occur.

The detection of an access fault or performance decline signifies a decline in the redundancy of the network, processor, or similar which guarantees access to the external device. Hence in order to guarantee access to data stored in the external device, either redundancy must be restored quickly, or the data of the external device must be saved to (transferred to) another device.

A control processor 132 which has detected an anomaly transmits a message or signal to the management server 110 warning of an anomaly in the external device, and causes the management server 110 to acknowledge the occurrence of the anomaly.

Next, processing to detect anomalies in external devices by the external device monitoring processing program 222 is explained. A control processor 132 periodically monitors the operating state of external devices according to the external device monitoring processing program 222.

The occurrence of faults during input/output processing in an external device which is accessed by a host 100 with a certain frequency can be detected according to the input/output request processing program 221. However, in the case of external devices storing archive data, or in the cases of other devices accessing of which occurs only rarely, it is necessary to monitor the state of the external device on occasions other than accessing by a host 100. Consequently external device monitoring processing is provided, according to the external device monitoring processing program 222.

Figure 9:
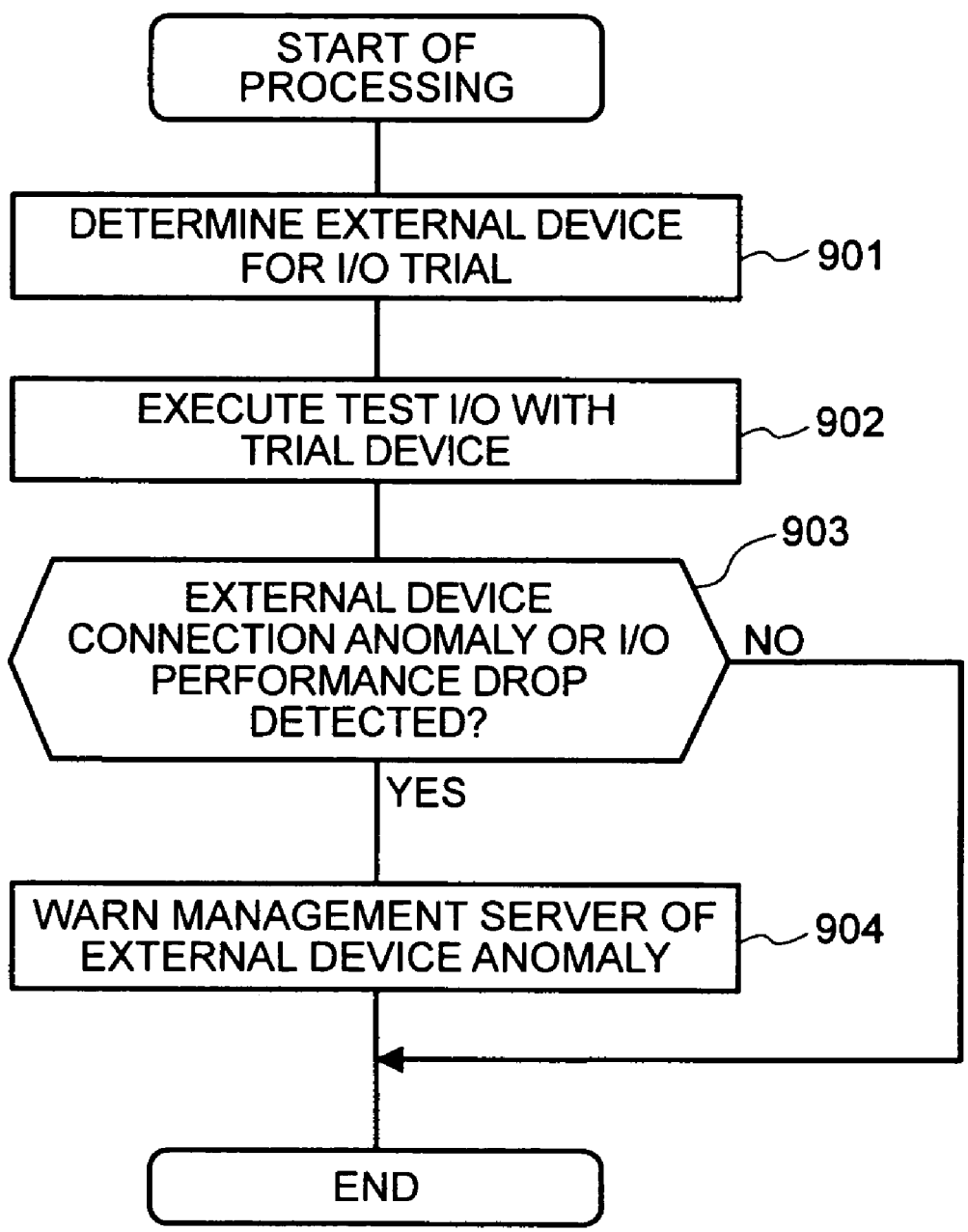
FIG. 9 shows the flow of processing by an external device monitoring processing program in the first aspect.

FIG. 9 is one example of the flow of processing to detect anomalies in an external device by the external device monitoring processing program 222.

The control processor 132 periodically starts the external device monitoring processing program 222 with a predetermined frequency. The startup frequency is set so as not to impede input/output requests from hosts 100.

The control processor 132 selects the external device for which to perform trial input/output from among all the external devices being managed and described in the external device management information 203 (step 901), and executes test I/O (for example, read processing) for the external device thus selected (step 902), according to the external device monitoring processing program 222.

In this step, the external device for testing is selected each time based on the time elapsed from the last time the device was accessed by a host 100, and other criteria. The method of selection is not limited to this method. Further, in this aspect trial input/output is performed for one external device upon each startup; but trial input/output may be performed for a plurality of external devices.

In the trial input/output for the selected external device, when an anomaly is detected in the external device (step 903), the control processor 132 warns the management server 110 of the external device anomaly (step 904). The method of anomaly detection is the same as in step 805 of the flow of input/output request processing, and so an explanation is omitted.

In this way, when the control processor 132 detects an anomaly which may impede access to an external device being managed, it warns the management server 110 of this fact. In the management server 110, transfer processing of the external device is performed, based on the external device anomaly warning from the storage unit 130, which is virtualized storage, and/or on a fault occurrence report from storage unit being managed (the external storage unit 150 which is virtual storage).

Below is an explanation of the processing performed by the management server 110 upon receiving a warning from the storage unit 130 indicating the occurrence of an anomaly in an external device (hereafter called "anomaly warnings"), and/or a fault occurrence report from storage unit being managed (external storage unit 150).

Figure 10:
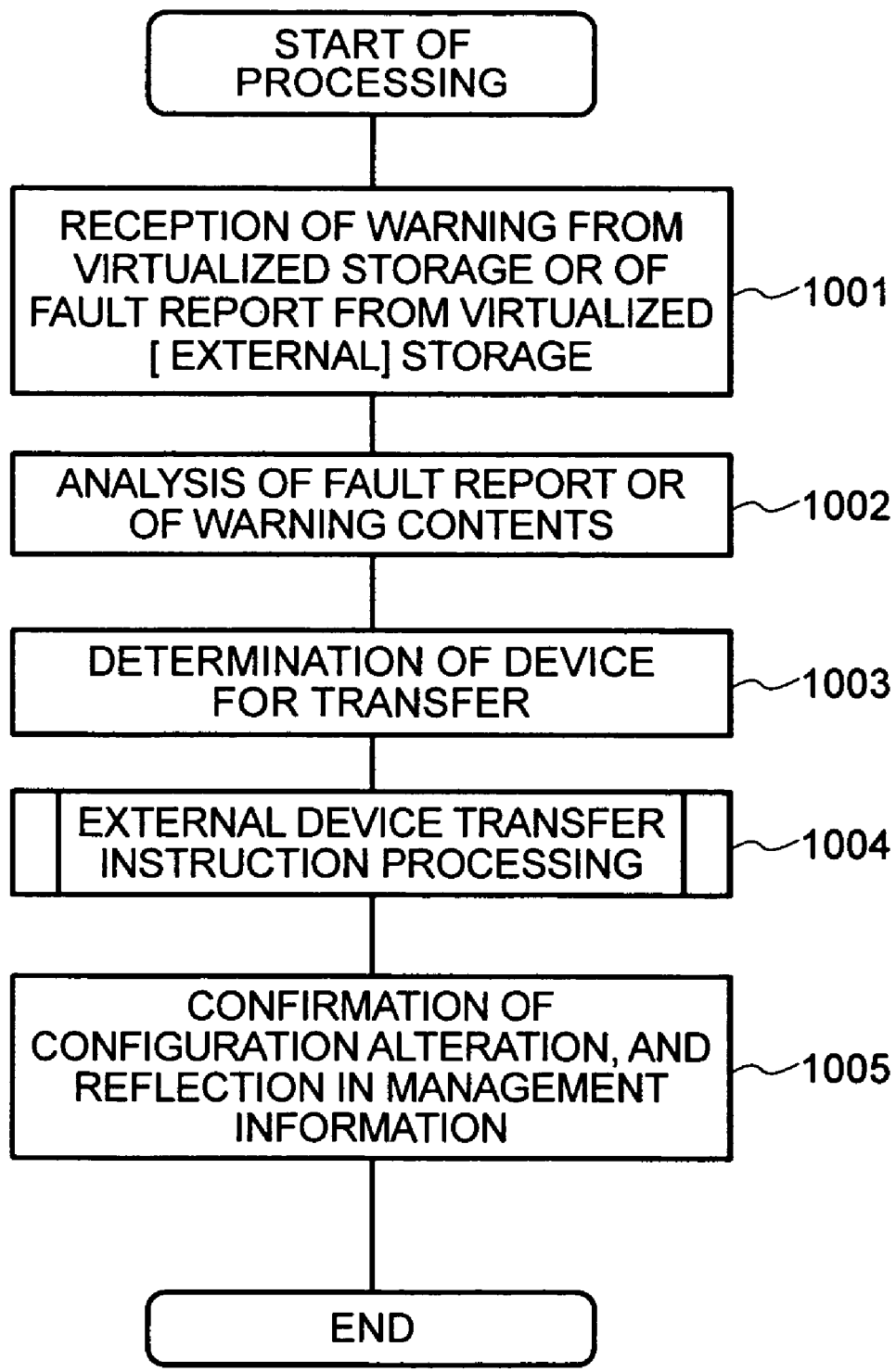
FIG. 10 shows the flow of processing by a storage monitoring processing program in the first aspect.

FIG. 10 is one example of the flow of processing of the storage monitoring processing program 241 executed by the management server 110. The CPU 111 performs the following processing by executing the storage monitoring processing program 241.

The CPU 111 receives an anomaly warning from the storage unit 130, and/or a fault occurrence report from the external storage unit 150 (step 1001).

The CPU 111 analyzes the received anomaly warning and/or fault report (step 1002).

The CPU 111 decides which external devices are affected, according to information stores in the received anomaly warning and/or fault report, and also judges whether data transfer is necessary for logical devices judged to be affected, and selects the range of external devices (logical device group) for transfer (step 1003).

Here, upon receiving an anomaly warning, the CPU 111 extracts information for the external device stored in the anomaly warning as well as the anomaly details (access fault, decline in responsiveness or throughput). Based on the extracted external device information and anomaly details, the external storage unit 150 comprising the external device is accessed, and existing techniques are used to investigate the details of the location of fault occurrence, the extent of the fault, and similar.

When a fault report is received, the information stored in the fault report is used to identify the location of fault occurrence, extent of the fault, and similar.

The location of fault occurrence is for example the site of the fan, power supply, disk cache, port, disk device, or similar of the external storage unit 150 for which a fault has been reported; the extent of the fault is a level indicating whether, due to the fault occurrence, the site cannot be used, or whether the fault is temporary and recovery to normal is already in progress with respect to configuration information of the storage unit; the extent of the fault can be judged from information on the type of fault. In the latter case, recovery to the normal state is in progress, and so no action need be taken with respect to the external device in question.

The CPU 111 receives the latest configuration information, including device information, from the external storage unit 150 for which an anomaly warning and/or fault report was issued, and identifies the logical device group for which availability is reduced as a consequence of the fault.

For example, when the site of the fault occurrence is the fan and power supply, and if there are few remaining replacements for the fan and power supply, the availability of all logical devices mounted in the storage unit is reduced. In this case, the CPU 111 determines that the range of reduced availability is the entirety of logical devices.

When a fault occurs in one side of the doubly redundant memory of the disk cache 154 due to a fault, it is anticipated that there will be a sharp decline in the availability and performance level of all the logical devices of the external storage unit 150 for which the anomaly warning and/or fault report is issued. In this case also, the CPU 111 determines that the range over which availability is degraded extends to all the logical devices of the external storage unit 150.

When a fault occurs in a specific disk device 156, and the redundancy of the RAID group to which the disk device 156 belongs is lost, and if there remain no substitute disk devices within the external storage unit 150 comprising the disk device 156, then the availability of the logical disk group associated with the RAID group is reduced. In this case, the CPU 111 determines that the range over which availability is degraded is the logical device group associated with the RAID group to which the disk device 156 in which the fault has occurred belongs.

When the logical device group which is affected has been determined, the CPU 111 uses the external device management information within the copy 231 of the device management information to investigate whether, in the logical device group affected by the reported fault, there exist any devices which are managed as the external devices of other storage unit.

When the external device group for transfer is determined, the CPU 111 issues an instruction for transfer of the data within the external device for transfer to the storage unit 130, according to the external device transfer instruction processing program 242 (step 1004).

When external device transfer (data transfer) by the storage unit 130 is completed, and a transfer completed notification is received from the storage unit 130, the CPU 111 receives into memory 112 the updated device configuration information for the storage unit 130 (logical device management information 201, physical device management information 202, external device management information 203, LU path management information 204) as a copy 231 of the device management information, and processing is concluded (step 1005).

Next, details of the processing of the above step 1004, performed according to the external device transfer instruction processing program 242, are explained.

Figure 11:
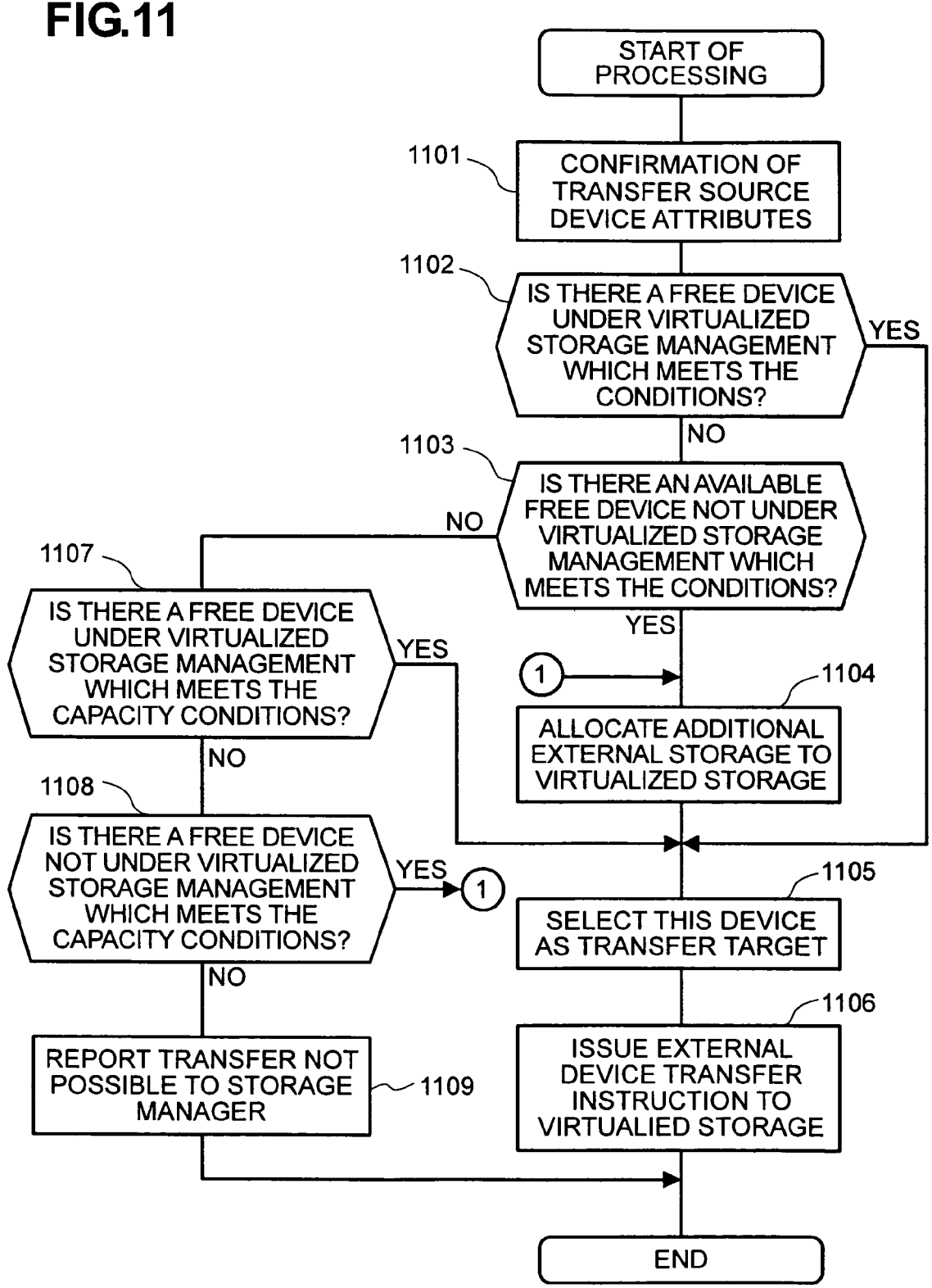
FIG. 11 shows the flow of processing by an external device transfer instruction processing program in the first aspect.

FIG. 11 is one example of the flow of processing by the CPU 111 of the management server 110, according to the external device transfer instruction processing program 242.

When external devices for which device transfer is necessary are determined according to the storage monitoring processing program 241, the CPU 111 takes these external devices to be the transfer source, determines the transfer target device, and issues an external device transfer instruction (instruction to perform data transfer) to the storage unit 130.

First, the CPU 111 references the storage management information 232 and similar, to confirm the performance, reliability level, and other attributes of the transfer source devices (step 1101).

The CPU 111 investigates whether there exists an unused physical device in the external storage unit 150a, 150b under management by the storage unit 130 which has virtualized and managed the external devices which are the transfer source devices or in the storage unit 130, that is, a (free) device not allocated to a logical device and having a performance/reliability level and similar equal to or exceeding that of the transfer source devices (step 1102).

The copy 231 of device management information for each of the storage units and the storage management information 232 in the memory 112 of the management server 110 are used in this investigation of free devices.

When there exists a free device under the management of the storage unit 130, which is unused and satisfies the above conditions, the CPU 111 determines this device to be the data transfer target (step 1105). When the transfer target is determined, the CPU 111 transmits an external device transfer instruction to the storage unit 130 (step 1106). Information specifying the transfer source and transfer target is contained in the external device transfer instruction. In this aspect, the external device number 61 of the external devices is used. In cases in which the transfer target is a device of the storage unit 130, the physical device number 51 is used instead of an external device number 61.

When on the other hand no free device exists, the CPU 111 investigates whether there exists a free device satisfying the conditions within storage unit which is under the management of the management server 110, and which is not under the virtualized control of the storage unit 130 (step 1103).

If a free device satisfying the conditions is found, the CPU 111 instructs the storage unit 130 to register the device as an external device (step 1104).

The processing performed in step 1104 is similar to the processing, performed at the time of system construction, in which the logical devices of other external storage unit 150 connected to the storage unit 130 are registered as external devices.

Specifically, the control processor 132 issues an inquiry to the external storage unit 150 in question, and registers the external device management information 203. Then, in the management server 110, the logical devices of the external storage unit in question are associated as external devices of the storage unit 130, and the copy 231 of the device management information is updated.

The CPU 111 selects an external device registered in step 1104 as the transfer target (step 1105), and issues an external device transfer instruction to the storage unit 130 (step 1106).

On the other hand, when in the investigation of step 1103 a free device satisfying the conditions is not found, an investigation of the existence of devices is performed once again within the range of investigation of step 1102, that is, free devices under the virtualized control of the storage unit 130 which, though not satisfying the performance/reliability level condition, have the capacity of the transfer source devices (step 1107). This is done in order to avoid storing data in a device in which a fault has been discovered.

When a free device which satisfies only the capacity condition is discovered, the CPU 111 selects this device as the transfer target (step 1105), and issues an external device transfer instruction to the storage unit 130 (step 1106).

When a free device is not found, an investigation of the existence of devices is performed once again within the range of investigation of the next step 1103, that is, free devices under the management of the management server 110 and not under the virtualized control of the storage unit 130 which, though not satisfying the performance/reliability level condition, satisfy the capacity condition (step 1108).

When a free device is discovered, the CPU 111 instructs the storage unit 130 to register the free device as an external device (step 1104), selects the device as the transfer target (step 1105), and issues an external device transfer instruction to the storage unit 130 (step 1106).

When a free device cannot be found in step 1108 either, an output device 115 or similar means are used to inform the storage manager of the fact that transfer of the transfer source external device is not possible, and processing is interrupted (step 1109).

Next, processing of the storage unit 130 upon receiving an external device transfer instruction from the management server 110 is explained.

Figure 12:
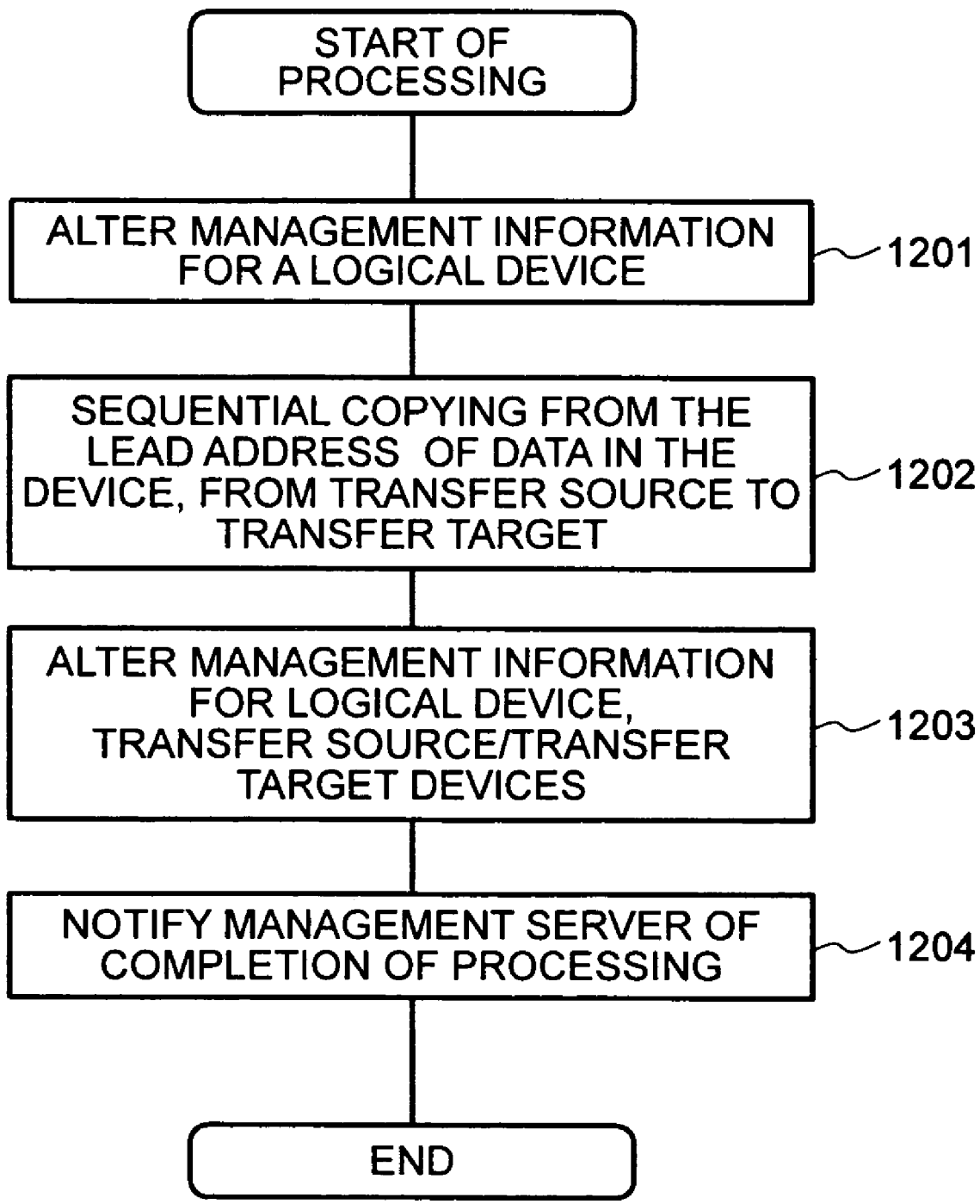
FIG. 12 shows the flow of processing by an external device transfer processing program in the first aspect.

FIG. 12 shows one example of the flow of external device transfer processing, executed by a control processor 132 according to the external device transfer processing program 223.

External device transfer processing is processing to transfer the data of a transfer source external device specified by the management server 110 to a transfer target device (an external device, or a physical device of the storage unit 130).

Upon receiving an external device transfer instruction from the management server 110, the control processor 132 registers the device transfer state in the logical device management information 201 for the logical device associated with the transfer source external device (step 1201).

Here, the control processor 132 sets the external device number 61 or physical device number 51 which is the transfer target in the physical/external device number during transfer 37, initializes the data transfer progress pointer 38 to 0, and sets the data transfer execution flag 39 to "On".

The control processor 132 then executes sequential data transfer from the transfer source external device to the transfer target physical/external device, from the beginning to the end, according to the external device transfer processing program 223, and in accordance with the data transfer progress pointer 38 (step 1202).

In this aspect, the control processor 132 executes this external device transfer processing while receiving input/output from hosts 100. When during data transfer there is an input/output request from a host 100 for a logical device associated with an external device which is the transfer source, the control processor 132 uses the data transfer progress pointer 38 of the logical device management information 201 to judge whether transfer of the data to be accessed has been completed. In the case of input/output for areas the transfer processing of which is judged not to have been completed, duplicate writing to both the areas of the transfer source and transfer target devices, and similar control is executed.

When data transfer up to the end of the transfer source external device is completed, the control processor 132 updates the logical device management information 201, external device management information 203, and physical device management information 202 for the logical devices, physical devices, and external devices involved in the data transfer (step 1203).

That is, the associative relation between logical devices and external devices or physical devices after the completion of data transfer is stored in these types of management information.

Here, the external/physical device number of the transfer target is set in the associated physical/external device number 33 of the logical device management information 201, and the data transfer execution flag 39 is set to "Off".

When the transfer target is a physical device, the number of the logical device set as the transfer target external/physical device number in the associated physical/external device number 33 is set in the associated logical device number 53 of the physical device management information 202, and the device state 54 is set to "online".

When the transfer target is an external device, the number of the logical device set as the transfer target external/physical device number in the associated physical/external device number 33 is set in the associated logical device number 63 of the external device management information 203, and the device state 64 is set to "online".

Further, an invalid value is set as the associated logical device number 63 of the external device management information 203 for the transfer source external device, and the device state 64 is set to "offline".

When updating of the different types of management information is completed, the control processor 132 notifies the management server of the fact that external device transfer processing has been completed (step 1204).

As explained above, in this aspect appropriate control can be executed in storage having external storage connection functions, enabling the detection of anomalies which are prognostications of faults occurring in external storage devices, the identification of the range of equipment affected, and the execution of data transfer.

Hence in this aspect, even when, in a computer system having a storage system comprising storage unit having external storage connection functions and external storage unit connected to the above storage unit, the external storage unit is a storage device with comparatively low reliability, the availability of the system as a whole can be improved.

When new storage unit is introduced and the overall capacity of the storage system is increased, and all the data held by devices in existing storage is transferred to the new storage unit to replace the above, it is necessary that the newly introduced storage unit comprise capacity equal to that of the existing storage devices, and so the cost of storage unit introduction is increased. Further, if existing storage unit and new storage unit are both connected directly to hosts, control on the host side becomes complicated.

By means of this aspect, new storage unit can be introduced without modifying the mode of access by hosts, and a computer system can be constructed in which existing storage unit can be effectively utilized. As a result, the cost of equipment introduction can be reduced.

Second Aspect

Next, a second aspect is explained. Here, only differences with the first aspect are explained.

The hardware configuration of a computer system to which this aspect is applied is similar to that of the first aspect, shown in FIG. 1. In this aspect, a plurality of loigcal devices of the one or more external storage units 150 shown in the figure are collected to constitute a RAID group. In this aspect, logical devices are defined for this RAID group. For simplicity, a one-to-one correspondence between logical devices and RAID groups is assumed.

By forming RAID groups from the logical devices of the external storage unit 150, in this aspect two types of methods to protect the data of external devices are possible; these are the data transfer method explained in the first aspect, and a data recovery method using another device comprised by the RAID group after an external device can no longer be accessed.

In this aspect, because RAID groups are configured from logical devices of external storage unit 150, the data stored as logical device management data 201 differs from that in the first aspect.

FIG. 14 shows an example of the configuration of logical device management information 201.

The logical device management information 201 in this aspect comprises, for each logical device, a logical device number 1401; size 1402; associated physical/external device number 1403; device state 1404; RAID configuration (RAID level, data/parity disks) 1405; stripe size 1406; physical/external device number list 1407; transfer/recovery source physical/logical device number and transfer/recovery target physical/logical device number 1408; data transfer/recovery progress pointer 1409; and data transfer/recovery execution flag 1410.

An identification number to identify the logical device is registered as the logical device number 1401. The capacity of the logical device specified by the logical device number 1401 is stored as the size 1402.

The physical/external device number associated with the logical device is stored as the associated physical/external device number 1403. This number is stored at the time of definition of the logical device. When the logical device is not allocated to a physical/external device, an invalid value is set as the associated physical/external device number 1403.

Similarly to the first aspect, information indicating the state of the logical device is set as the device state 1404.

Information relating to the RAID level, number of data disks, number of parity disks and similar of the RAID group constituting the physical/external device allocated to the logical device is stored in the RAID configuration 1405. Similarly, the data division unit (stripe) length in the RAID group is stored in the stripe size 1406. Identification numbers for each of the plurality of physical/external devices comprised by the RAID group to which the logical device is allocated are stored in the physical/external device number list 1407.

In this aspect, because data recovery processing is also performed, the data transfer/recovery execution flag 1410 can assume three values, which are "data being transferred", "data being recovered", and "off". When the data of an external device is transferred to another physical/external device, the flag is set to "data being transferred", and when data recovery is being performed for an external device which can no longer be accessed, the flag is set to "data being recovered".

When, because of a fault or some other reason, data is transferred to another external/physical device or data recovery is being performed, the external/physical device number for the transfer/recovery source, and the external/physical device number for the transfer/recovery target, are set in the transfer/recovery source physical/logical device number and transfer/recovery target physical/logical device number 1408. Information indicating the leading address of the area for which data transfer or recovery processing has not been completed is stored in the data transfer/recovery progress pointer 1409. This value is updated as the data transfer or recovery processing advances.

At the time of initiation of data transfer/recovery processing, the entry 1408 is set, the entry 1409 is initialized, and the entry 1410 is set to a value indicating "data being recovered" or "data being transferred".

In this aspect, the storage unit 130 manages the device hierarchy using four types of device management information, similarly to the first aspect. Logical devices are defined by combining pluralities of physical devices defined in advance, and external devices defined by users or by storage managers. LUNs are defined for each of the ports 131 of logical devices defined in this way.

In this aspect, a plurality of external devices and physical devices are combined to configure a RAID group. Similarly to the first aspect, decreases in the availability of components supporting access to external devices are detected, external device faults are predicted, and preventative data transfer is performed in advance; in addition, after either an external device or a physical device has become inaccessible, the information of the external device which has become inaccessible can be recovered from other physical/external devices comprised by the RAID group.

The fact that a physical/external device has become inaccessible can be detected by processing to detect external device anomalies according to the external device monitoring processing program 222 and input/output request processing program 221, which were also comprised by the first aspect. Detection is also possible through fault reports from external storage unit 150, obtained from the existing functions of the management server.

In this aspect, the storage unit 130 comprises an external device recovery processing program (not shown) in memory 133, and the management server 110 comprises an external device recovery instruction processing program (not shown) in memory 112, in order to perform recovery processing for an external device or physical device which has become inaccessible and has been detected by the above-described programs.

The external device recovery processing program is executed by a control processor 132, and the external device recovery instruction processing program is executed by the CPU 111, to perform their respective functions.

The functions realized by the input/output request processing program 221, external device monitoring processing program 222, and storage monitoring processing program 241 are similar to those in the first aspect, and so an explanation is here omitted.

The management server 110 of this aspect selects the recovery target device (physical/external device) to store recovery data according to the external device recovery instruction processing program, and issues a data recovery instruction to the storage unit 130. The flow of processing of the external device recovery instruction processing program is similar to the flow of processing of the external device transfer instruction processing program 242 explained in the first aspect, but with "transfer instruction" replaced with "recovery instruction", and "transfer source/target device" replaced with "recovery source/target device", and so an explanation is here omitted.

Figure 13:
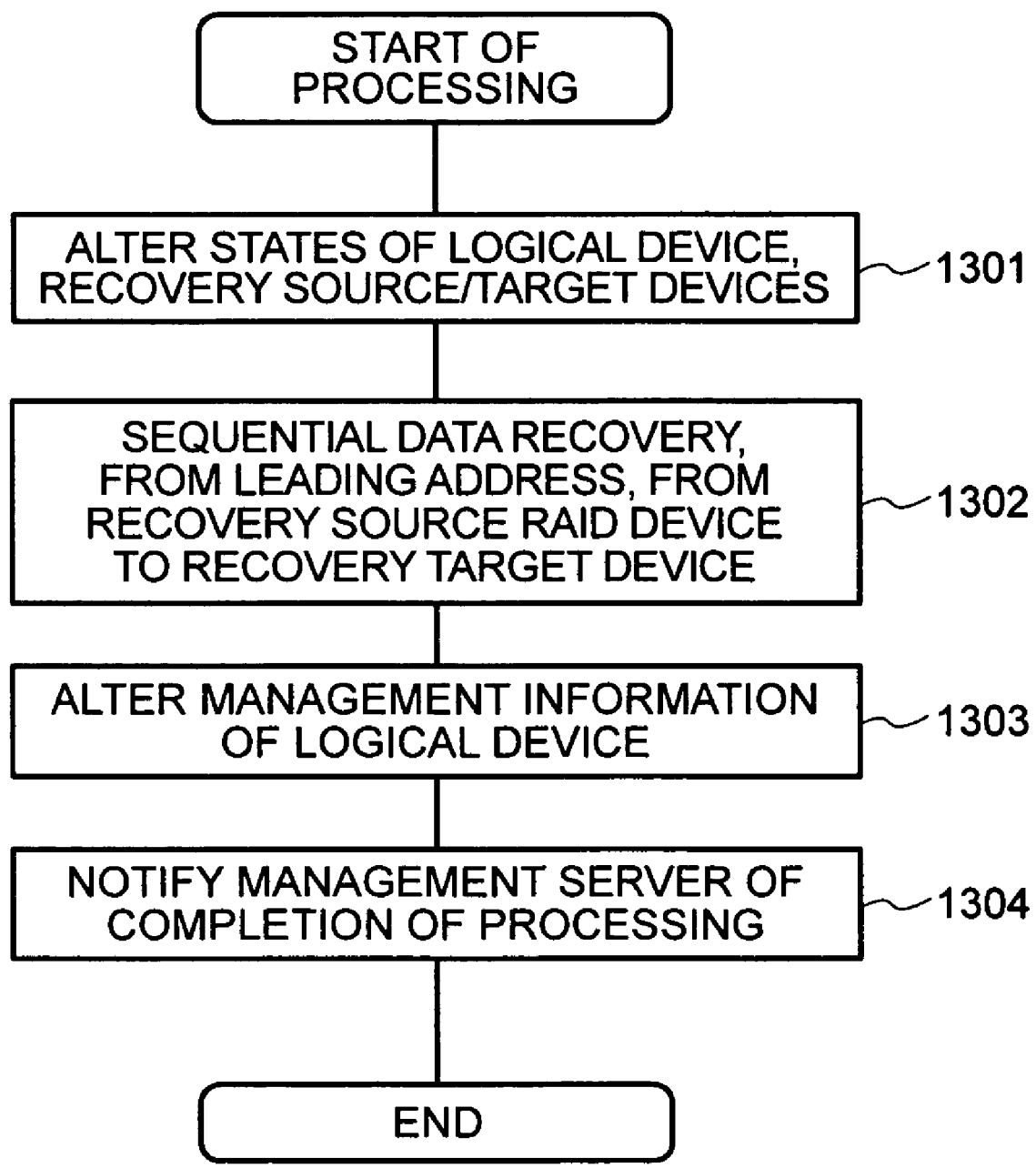
FIG. 13 shows the flow of processing by an external device recovery processing program in a second aspect; and, FIG. 14 shows one example of logical device management information in the second aspect.

FIG. 13 shows an example of the flow of processing for external device recovery in this aspect, according to the external device recovery processing program executed by a control processor 132.

Upon receiving an external device recovery instruction from the management server 110, the control processor 132 executes external device recovery processing according to the external device recovery processing program.

The control processor 132 registers information indicating that recovery is being executed in the management information for the logical device for which the recovery instruction was received (step 1301). At this time, the logical device management information 201 for this logical device, the external device management information 203 for the recovery source and recovery target, and the physical device management information 202 for the recovery source and recovery target are updated, and the logical device association is replaced.

The control processor 132 recovers the data from another external/physical device for which the logical device, to which the recovery source external device belongs, is defined, and stores the data in the recovery target external/physical device, in sequence from the leading address (step 1302).

When data recovery up to the end of the device is completed, the control processor 132 sets the data transfer/recovery execution flag 1410 indicating the processing state of the logical device to "off" (step 1303), and notifies the management server 110 of the completion of recovery processing (step 1304).

As explained above, by means of this aspect, not only can an external device fault be predicted and data within the device be transferred as a preventive measure, similarly to the first aspect, but after a fault has actually occurred and access is no longer possible, the data within the external device can be recovered.

Hence through the configuration of this aspect, in a computer system which presents to hosts in virtualized form the devices within first storage unit connected to second storage unit as its own devices, fault management and handling can be realized for the devices of the first storage unit, so that the availability of the computer system as a whole can be improved.

This invention is not limited to the above-described two aspects, but can be variously modified.

In the above two aspects, the management server 110 determines whether external device transfer should be performed, based on performance/reliability level information maintained for each storage unit, the site of the fault occurrence, and the level of the fault which has occurred.

However, in addition to the above decision criteria, a user or storage manager may define the reliability level required for each logical device in advance, and measures to cope with external device faults may be decided according to such reliability levels.

For example, whether or not to perform device transfer for an external device anticipated to become inaccessible due to a fault may be decided based on the (required) reliability level of the logical device defined for the physical device. In other words, when the required reliability level is high, processing is performed immediately for transfer to another external/physical device, but when the required reliability level is low, transfer processing is not performed, a fault report is sent to the storage manager, and an instruction from the storage manager is awaited.

In the above two aspects, the transfer target/recovery target device is determined by giving priority to selection of external devices or of physical devices within the storage unit 130 which satisfy the performance/reliability level requirements defined for the external device for which an anomaly has been detected. However, reduction of the time required for transfer completion may be emphasized to select a free device within the storage unit 130 meeting only the capacity condition, and after data transfer is completed the data may be transferred to another device meeting the performance/reliability level condition.

In the second aspect, an example was explained in which, when one of the external devices comprised by a RAID group becomes inaccessible, only the data within the external device which has become inaccessible is recovered to another physical/external device.

However, when another device comprised by the RAID group is in the same external storage unit 150 as the external device which has become inaccessible, it is possible that a plurality of other devices in the RAID group may also be subjected to data transfer. In such cases, the external device transfer instruction processing program 242 selects a recovery target device for the external device in which the fault has occurred, and selects a transfer target device for external devices other than the external device of the fault and which are to be subjected to data transfer, and issues a device recovery instruction and transfer instruction to the storage unit 130. The storage unit 130 reads the data of the physical/external devices comprising the RAID group, and performs processing in parallel to both recover data to the recovery target device and also to transfer the data of the external devices for read transfer to transfer target devices.

What is claimed is:

1. A management server, managing a second storage system which provides a host computer with access to both a second physical device in the second storage system and a first logical device configuring a parity group in a first storage system coupled to the second storage system, comprising:

transfer source decision means for identifying, based on information received from said second storage system prognosticating a fault or detecting a fault in said first logical device, a storage area affected by said fault as a transfer source; and data transfer instruction means for selecting, based on data capacity and evaluation of performance and reliability levels determined in advance of transfer of data of said transfer source, a storage area of a transfer target from among storage areas of said first storage system and said second storage system managed by said second storage system, and for issuing to said second storage system an instruction to configure said parity group with said transfer target and said first logical device except said transfer source and to transfer the data of said transfer source to said transfer target, wherein if said data transfer instruction means selects a storage area of a transfer target, said first logical device configures said parity group with said transfer target in said second storage system and said first logical device except said transfer source in said first storage system, wherein said data transfer instruction means selects a first device, satisfying both the conditions of having the data capacity of said transfer source and of being evaluated as meeting said predetermined performance and reliability levels, from among the storage areas of said first storage system or of said second storage system managed by said second storage system, and determines said first device to be the transfer target storage area; and when no first device exists which satisfies both of said conditions within the storage areas of said first storage system or said second storage system managed by said second storage system, a second device which at least satisfies said data capacity condition is selected, and said second device is determined to be the transfer target storage area.

2. The management server according to claim 1, wherein when no second device exists which satisfies at least said data capacity condition within storage areas of said first storage system or said second storage system managed by said second storage system, a third device is selected which satisfies both said data capacity condition and said performance and reliability level evaluation condition from among the storage area of another storage system being managed by said management server, said third device is determined as the transfer target storage area, and an instruction is issued to said second storage system to register the third device selected as the transfer target as an external device providing access to the host computer;

when no third device exists which satisfies both of said conditions within the storage areas of said other storage systems, a fourth device which satisfies at least said data capacity condition is selected from among the storage areas of said another storage systems, the fourth device is determined as the transfer target, and an Instruction is issued to said second storage system to register the fourth device selected as the transfer target as an external device of said second storage system; and, when no fourth device exists which satisfies at least said data capacity condition within the storage areas of said another storage systems, information indicating that data transfer is not possible is output.

3. A storage system, comprising:

physical devices installed within said storage system;

managing as logical devices both external devices in an external storage system coupled to and separate front said storage system and said physical devices in said storage system, logical device management means for allocating logical devices to said physical devices and said external devices and managing both said physical devices and said external devices with respect to device configuration information in association wit said logical devices provided to a host;

input/output processing means for performing processing, when an input/output processing request for a logical device is received from said host to convert the received input/output request into input/output processing for said physical device or said external device based on said device configuration information, and to perform input/output processing according to said conversion result;

anomaly detection means for judging the occurrence, during input/output processing for an accessed one of said external devices by said input/output processing means, of an access fault or performance decline forte accessed external device;

notification means for issuing, when an access fault or decline in performance has been detected by said anomaly detection means, notification of the detected anomaly and the accessed external device to a management server which manages said storage system and said external storage system; and, data transfer means for performing, upon receipt of an instruction from said management server for data transfer specifying the transfer source and transfer target, the transfer of the data of said transfer source to said transfer target according to the instruction; and wherein said logical device management means updates said device configuration information after the completion of said data transfer.

4. The storage system according to claim 3, further comprising external device monitoring means for determining said external devices to be accessed at predetermined periods, and for executing input/output processing for said external devices.

5. A storage system, comprising:

a first storage system having physical devices; and a second storage system having physical devices, coupled to and separate from said first storage system and further coupled to a computer, wherein said first storage system comprises external device provision means for providing said physical devices in said first storage system to said second storage system as external devices with respect to said first storage system; and, said second storage system comprises;

logical device management means for allocating logical devices to said physical devices in said second storage system and said external devices provided by said external device provision means, and managing both said physical devices installed within said second storage system and said external devices with respect to device configuration information associated with said logical devices accessed by a host computer;

input/output processing means for performing processing, when an input/output request is received from the host computer, to convert the received input/output request into input/output processing for one of said physical devices in said second storage system or one of said external device based on said device configuration information, and to perform input/output processing according to said conversion result;

anomaly detection means for judging the occurrence, during input/output processing for an accessed one of said external devices by said input/output processing means, of an access fault or performance decline for the accessed external device;

notification means for issuing, when an access fault or decline in performance has been detected by said anomaly detection means, notification of the detected anomaly and the accessed external device to a management server which manages said second storage system and said first storage system; and, data transfer means for performing, upon receipt of an instruction from said management server for data transfer specifying the transfer source and transfer target, the transfer of the data of said transfer source to said transfer target according to the instruction; and wherein said logical device management means updates said device configuration information after the completion of said data transfer.

6. A computer system, comprising:

at least one first storage system;

a second storage system having physical devices, coupled to and separate from said at least one first storage system; and a management server coupled to said at least one first storage system and said second storage system, wherein said at least one first storage system comprises external device provision means for providing a physical device in said at least one first storage system to said second storage system as an external device with respect to said second storage system;

wherein said second storage system comprises:

logical device management means for allocating logical devices to said physical devices in said second storage system and said external devices provided by said external device provision means, and managing both said physical devices installed within said second storage system and said external devices with respect to device configuration information in association with said logical devices accessed by a host computer;

monitoring means for monitoring said external devices;

notification means for notifying said management server when prognostication of a fault in one of said external devices is detected by said monitoring means; and data transfer means for transferring data according to a data transfer instruction received from said management server, and for updating said device configuration information according to the data transfer; and wherein said management server comprises data transfer instruction means for selecting a data transfer range as a transfer source and for selecting a transfer target based on notification from said notification means, and for issuing a data transfer instruction to said second storage system, specifying the transfer range and transfer target and instructing transfer of the data of said data transfer range to said transfer target.

7. The computer system according to claim 6, wherein said second storage system further comprises:

input/output instruction means for performing processing, when an input/output request for a logical device is received from the host computer, to convert the received input/output request into input/output processing for one of said physical devices or one said external device based on said device configuration information, and to perform input/output processing according to said conversion result; and anomaly detection means for judging the occurrence, during input/output processing for an accessed external device by said input/output processing means, of an access fault or performance decline forte accessed external device;

wherein said notification means issues, when an access fault or decline in performance has been detected by said anomaly detection means, notification of the detected anomaly and the accessed external device to the management server;

wherein said management server further comprises transfer source decision means for identifying, based on information received from said second storage system for said detected anomaly and said accessed external device, storage areas in which faults may occur due to the anomaly as the transfer source; and, wherein said data transfer instruction means selects the transfer target from among the storage areas of said at least one first storage system or said second storage system, based on the data capacity of said transfer source determined by said transfer source decision means and on evaluation of predetermined performance and reliability levels, and issues a data transfer instruction to said second storage system, specifying said transfer source and said transfer target.

8. The computer system according to claim 7,
wherein said monitoring means determines said external devices for accessing at predetermined intervals, and causes said input/output instruction means to execute input/output processing for said external devices.

9. The computer system according to claim 6,
wherein said monitoring means monitors the states of said external devices, and upon detecting a prognostication of a fault occurrence, said notification means notifies said management server of the details of the detected prognostication and the external device being monitored;
said management server further comprises analysis means for analyzing, upon receiving said notification from said notification means, the received notification details, and for determining as the transfer source the external device which would be affected upon occurrence of the fault contained in the notification; and,
said data transfer instruction means confirms the capacity of the transfer source external device determined by said analysis means, selects a device as said transfer target from among the devices being managed by said second storage system, and other than the external device which was accessed when said fault prognostication occurred.

10. The computer system according to claim 9,
wherein external devices provided by said external device provision means are provided from RAID groups and said RAID groups are configured by physical devices of said at least one first storage system;
said notification means issues notifications of the occurrence of faults in addition to notification of said prognostications of fault occurrence; and,
said analysis means, upon receiving notification of fault occurrence from said notification means, analyzes the received notification, identifies the RAID group to which the external device in which the fault has occurred belongs, and recovers the data of said external device in which the fault has occurred using data held by other devices constituting said identified RAID group, while also setting the recovered data as said transfer source.

11. The computer system according to claim 9, wherein said data transfer instruction means, upon determining the transfer target, confirms the performance and reliability level of the transfer source determined by said analysis means, and selects a transfer target which, in addition to satisfying said capacity condition, satisfies said performance and reliability level condition from among the devices being managed by said second storage system, and other than the device for which said fault prognostication occurred.

12. The computer system according to claim 11, further comprising a third storage system coupled to said management server,
wherein, if when determining the transfer target there is no transfer target device being managed by said second storage system which satisfies said capacity condition or said performance and reliability level condition, said data transfer instruction means selects a device from among said third storage system which satisfies at least said capacity condition as the transfer target, and issues an instruction to said second storage system to register as an external device the device of the third storage system as said transfer target in the second storage system.

13. A management server for managing a first storage system and a second storage system coupled to and separate from said first storage system, said first storage system having physical devices that are external devices with respect to the second storage system and, said second storage system having physical devices and receiving an access request for a logical device from a host computer and accessing one of said physical devices in said second storage system and an external device in said first system according to a received access request, said management server comprising:
a processor; and
a memory storing a program executed by said processor,
wherein, according to the program stored in said memory, said processor performs;
upon receiving notification from said second storage system indicating prognostication of a fault occurring in said external device, transfer sauce decision processing to identify as a transfer source a storage area affected by said fault based on said notification; and
data transfer instruction transmission processing to select as a data transfer target storage areas of said first storage system or said second storage system managed by said management server, based on the data capacity of said transfer source and predetermined performance and reliability level of the transfer source, and to transmit an instruction to said second storage system to transfer the data of said transfer source to said transfer target; and
wherein said data transfer instruction processing selects a first device, satisfying both the conditions of having the data capacity of said transfer source and meeting said predetermined performance and reliability levels, from among the storage areas of said first storage system or said second storage system and determines said first device to be the transfer target storage area; and
when no first device exists which satisfies both of said conditions within the storage areas of said first storage system or said second storage system, a second device which at least satisfies said data capacity condition is selected, and said second device is determined to be the transfer target.

14. A storage system, coupled to and separate from another storage system having physical devices that are external devices with respect to said storage system, which receives an access request to a logical device from a host computer and accesses one of said external devices in said another storage system associated with said logical device according to said received access request, comprising:
a plurality of physical devices, each associated with a logical device accessed by a host computer;
a processor coupled to said plurality of physical devices; and
a memory storing a program executed by said processor and device configuration information indicating an associative relation between said plurality of physical devices and said external devices with the logical devices accessed by a host computer,
wherein, in accordance with said program stored in said memory, said processor executes;
input/output processing, upon receiving an input/output request from the host computer, to convert the received input/output request into an input/output request for said physical device or said external device based on said device configuration information, and to perform input/output processing according to said conversion result;

anomaly detection processing to judge the occurrence of access faults or declines in performance for one of the external devices during input/output processing of said external device;

notification processing, when an access fault or decline in performance is detected in the one external device during said anomaly detection processing, to notify said storage system and a management server which manages said another storage system of the detected anomaly and the one external device being accessed;

data transfer processing, when a data transfer instruction specifying as a transfer source the one external device and a transfer target from among other external devices is received from said management server in response to a notification of detection of an access fault or decline in performance in the one external device, to perform data transfer according to said instruction; and, configuration information update processing to update said device configuration information after the completion of said data transfer with respect to said, physical devices, and said logical devices.

15. The storage system according to claim 14, wherein said processor further performs input/output processing for said external devices at predetermined intervals.

16. A fault avoidance and recovery method, in a computer system comprising at least one first storage system, a second storage system, and a management server coupled to said first storage system and to said second storage system, wherein;

said second storage system is coupled to and separate from said first storage system and said first storage system has physical devices that are external devices with respect to said second storage system;

wherein said second storage system has physical devices and comprises logical device management means allocating logical devices to said physical devices and said external devices and manages both said physical devices and said external devices with respect to device configuration information in association with logical devices provided to a host; said method comprising the steps of:

said second storage system, upon receipt of an input/output request from said host, converting the received input/output request into an input/output request for said physical devices or said external devices, based on said device configuration information;

said second storage system performing input/output processing according to the conversion result;

when the device for said input/output processing is one of said external devices, said second storage system judging whether an access fault or decline in performance has occurred for said one external device during said input/output processing;

when, as a result of said judgment, said access fault or decline in performance is detected in said one external device, said second storage system notifies said management server of the detected access fault or decline in performance and the one external device being accessed;

said management server receiving said notification from said second storage system;

said management server specifying storage areas in which a fault may occur due to said access fault or decline in performance as a transfer source, based on information contained in the received notification;

said management server selecting a transfer target from among the storage areas of said first storage system or said second storage system connected to said management server, based on the data capacity of said transfer source and predetermined performance and reliability levels;

said management server issuing an instruction to said second storage system to transfer the data of said transfer source to said transfer target;

said second storage system, upon receiving the data transfer instruction from said management server specifying the transfer source and transfer target, performing data transfer to transfer the data of said transfer source to said transfer target according to said instruction; and, after the completion of said data transfer, said second storage system updating said device configuration information with respect to the association of said physical devices and said external devices with said logical devices.

17. The fault avoidance and recovery method according to claim 16, wherein said external devices are part of RAID groups configured by external devices of said first storage system;

when an access fault or decline in performance is detected, said second storage system issues notification of the occurrence of the fault and the one external device in which the fault occurred to said management server; and, upon receiving notification from said second storage system of the occurrence of the fault and of the external device in which said fault has occurred, said management server recovers the data of the external device in which said fault has occurred, using the data held by other devices of the RAID group to which the external device in which said fault has occurred belongs, and selects the recovered data as said transfer source.

\* \* \* \* \*